US010713697B2

(12) United States Patent
Chung

(10) Patent No.: US 10,713,697 B2
(45) Date of Patent: Jul. 14, 2020

(54) FARM PRODUCT EXCHANGE SYSTEM AND METHOD SUITABLE FOR MULTIPLE SMALL PRODUCERS

(71) Applicant: AVANTE INTERNATIONAL TECHNOLOGY, INC., Princeton Junction, NJ (US)

(72) Inventor: Kevin Kwong-Tai Chung, Princeton, NJ (US)

(73) Assignee: AVANTE INTERNATIONAL TECHNOLOGY, INC., Princeton Junction, NJ (US)

( * ) Notice: Subject to any disclaimer, the term of this patent is extended or adjusted under 35 U.S.C. 154(b) by 529 days.

(21) Appl. No.: 15/448,127

(22) Filed: Mar. 2, 2017

(65) Prior Publication Data
US 2017/0278159 A1 Sep. 28, 2017

Related U.S. Application Data

(60) Provisional application No. 62/390,408, filed on Mar. 25, 2016, provisional application No. 62/390,283, filed on Mar. 24, 2016.

(51) Int. Cl.
*G06Q 30/00* (2012.01)
*G06Q 30/06* (2012.01)
(52) U.S. Cl.
CPC .............................. *G06Q 30/0609* (2013.01)
(58) Field of Classification Search
CPC .................................................. G06Q 30/0609
See application file for complete search history.

(56) References Cited

U.S. PATENT DOCUMENTS

| 4,135,147 A | 1/1979 | Riganati et al. |
| 5,715,314 A | 2/1998 | Payne et al. |
| 5,774,870 A | 6/1998 | Storey |
| 5,794,207 A | 8/1998 | Walker et al. |

(Continued)

FOREIGN PATENT DOCUMENTS

| WO | 2013/148552 | 10/2013 |
| WO | 2014/116561 | 7/2014 |

OTHER PUBLICATIONS

American farm exchange, LLC; american farm exchange launches comprehensive agricultural website. (Dec. 3, 2009). Food Business Week Retrieved from https://search.proquest.com/docview/203737450?accountid=14753.*

(Continued)

*Primary Examiner* — Kathleen Palavecino
(74) *Attorney, Agent, or Firm* — Clement A. Berard, Esq.; Dann, Dorfman, Herrell & Skillman, PC

(57) ABSTRACT

A method for a product exchange for plural producers may comprise: configuring an electronic device to provide geo-tagged and time stamped image data, receiving registration data from a producer, receiving facility data and product data, and storing the received data in a relational database separate from the electronic device, and repeating the foregoing for a plurality of producers. The method may further comprise receiving registration data and qualifying data from a buyer who is provided product data and may make an offer therefor, or may comprise receiving a request for a supply, equipment or educational material and facilitating the ordering and delivery thereof.

14 Claims, 11 Drawing Sheets

(56) References Cited

U.S. PATENT DOCUMENTS

| | | |
|---|---|---|
| 5,960,411 A | 9/1999 | Hartman et al. |
| 5,982,914 A | 11/1999 | Lee et al. |
| 6,027,026 A | 2/2000 | Husain et al. |
| 6,223,122 B1 | 4/2001 | Hancock et al. |
| 6,487,306 B1 | 11/2002 | Jain et al. |
| 6,657,543 B1 | 12/2003 | Chung |
| 6,696,954 B2 | 2/2004 | Chung |
| 6,703,935 B1 | 3/2004 | Chung |
| 6,883,710 B2 | 4/2005 | Chung |
| 6,892,944 B2 | 5/2005 | Chung |
| 6,943,688 B2 | 9/2005 | Chung |
| 6,961,000 B2 | 11/2005 | Chung |
| 6,973,581 B2 | 12/2005 | Chung |
| 7,036,729 B2 | 5/2006 | Chung |
| 7,036,730 B2 | 5/2006 | Chung |
| 7,077,313 B2 | 7/2006 | Chung |
| 7,098,793 B2 | 8/2006 | Chung |
| 7,158,030 B2 | 1/2007 | Chung |
| 7,173,722 B1 | 2/2007 | Lapstun et al. |
| 7,197,167 B2 | 3/2007 | Chung |
| 7,221,269 B2 | 5/2007 | Onderko |
| 7,319,397 B2 | 1/2008 | Chung |
| 7,342,497 B2 | 3/2008 | Chung |
| 7,382,255 B2 | 6/2008 | Chung |
| 7,422,150 B2 | 9/2008 | Chung |
| 7,423,535 B2 | 9/2008 | Chung |
| 7,431,209 B2 | 10/2008 | Chung |
| 7,436,989 B2 | 10/2008 | Chung |
| 7,456,748 B2 | 11/2008 | Cheng |
| 7,461,787 B2 | 12/2008 | Chung |
| 7,501,954 B1 | 3/2009 | Chung |
| 7,508,308 B2 | 3/2009 | Chung |
| 7,513,425 B2 | 4/2009 | Chung |
| 7,561,724 B2 | 7/2009 | Chung |
| 7,609,168 B2 | 10/2009 | Boverie |
| 7,614,553 B2 | 11/2009 | Chung |
| 7,623,036 B2 | 11/2009 | Onderko |
| 7,636,087 B2 | 12/2009 | Chung |
| 7,636,088 B2 | 12/2009 | Chung |
| 7,779,457 B2 | 8/2010 | Taylor |
| 7,797,231 B1 | 9/2010 | Loeb et al. |
| 7,813,934 B1 | 10/2010 | Chung |
| 7,828,215 B2 | 11/2010 | Chung |
| 7,828,654 B2 | 11/2010 | Carter, Sr. |
| 7,839,289 B2 | 11/2010 | Chung |
| 7,894,634 B2 | 2/2011 | Chung |
| 7,975,920 B2 | 7/2011 | Chung |
| 7,988,047 B2 | 8/2011 | Chung |
| 8,015,118 B1 | 9/2011 | Robinson |
| 8,047,435 B2 | 11/2011 | Johnson |
| 8,066,184 B2 | 11/2011 | Chung |
| 8,174,383 B1 | 5/2012 | Chung |
| 8,214,913 B2 | 7/2012 | Chung |
| 8,261,985 B2 | 9/2012 | Chung |
| 8,261,986 B2 | 9/2012 | Chung |
| 8,301,108 B2 | 10/2012 | Naboulsi |
| 8,630,513 B2 | 1/2014 | Gokturk |
| 9,286,511 B2 | 3/2016 | Chung et al. |
| 9,384,518 B2 | 7/2016 | Chung |
| 9,542,597 B2 | 1/2017 | Chung et al. |
| 2001/0036301 A1 | 11/2001 | Yamaguchi |
| 2003/0026462 A1 | 2/2003 | Chung et al. |
| 2003/0039382 A1 | 2/2003 | Yau et al. |
| 2003/0136835 A1 | 7/2003 | Chung et al. |
| 2004/0208343 A1 | 10/2004 | Golden |
| 2004/0213437 A1 | 10/2004 | Howard et al. |
| 2004/0233040 A1 | 11/2004 | Lane |
| 2005/0169503 A1 | 8/2005 | Howell |
| 2005/0181765 A1 | 8/2005 | Mark |
| 2006/0047970 A1 | 3/2006 | Mochizuki |
| 2007/0014440 A1 | 1/2007 | Lo |
| 2007/0017985 A1 | 1/2007 | Lapstun et al. |
| 2007/0071206 A1 | 3/2007 | Gainsboro et al. |
| 2008/0273770 A1 | 11/2008 | Kohout |
| 2008/0279416 A1 | 11/2008 | Lo |
| 2008/0301102 A1 | 12/2008 | Liang |
| 2009/0049534 A1 | 2/2009 | Chung |
| 2009/0324211 A1 | 12/2009 | Strandell et al. |
| 2010/0141385 A1 | 6/2010 | Shiau et al. |
| 2010/0145947 A1 | 6/2010 | Kolman et al. |
| 2010/0170948 A1 | 7/2010 | Chung |
| 2010/0223663 A1 | 9/2010 | Morimoto et al. |
| 2010/0252628 A1 | 10/2010 | Chung |
| 2010/0333194 A1 | 12/2010 | Ricordi et al. |
| 2011/0089236 A1 | 4/2011 | Chung |
| 2011/0130636 A1 | 6/2011 | Daniel et al. |
| 2011/0282631 A1 | 11/2011 | Poling et al. |
| 2011/0314526 A1 | 12/2011 | Valentine et al. |
| 2012/0123674 A1 | 5/2012 | Perks et al. |
| 2012/0190386 A1 | 7/2012 | Anderson |
| 2012/0206485 A1 | 8/2012 | Osterhout et al. |
| 2012/0212406 A1 | 8/2012 | Osterhout et al. |
| 2013/0251214 A1 | 9/2013 | Chung |
| 2014/0003727 A1 | 1/2014 | Lortz et al. |
| 2014/0067605 A1 | 3/2014 | Schwab |
| 2014/0279096 A1 | 9/2014 | Akin |
| 2015/0363586 A1 | 12/2015 | Kievan |
| 2016/0358296 A1 | 12/2016 | Chung |

OTHER PUBLICATIONS

International Searching Authority, "PCT Search Report and Written Opinion", International Application No. PCT/US17/20688, dated May 11, 2017, 21 pages.

International Searching Authority, "PCT Search Report and Written Opinion", International Application No. PCT/US13/33662, dated Jun. 28, 2013, 9 pages.

International Searching Authority, "PCT Search Report and Written Opinion", International Application No. PCT/US14/12256, dated Jun. 16, 2014, 9 pages.

\* cited by examiner

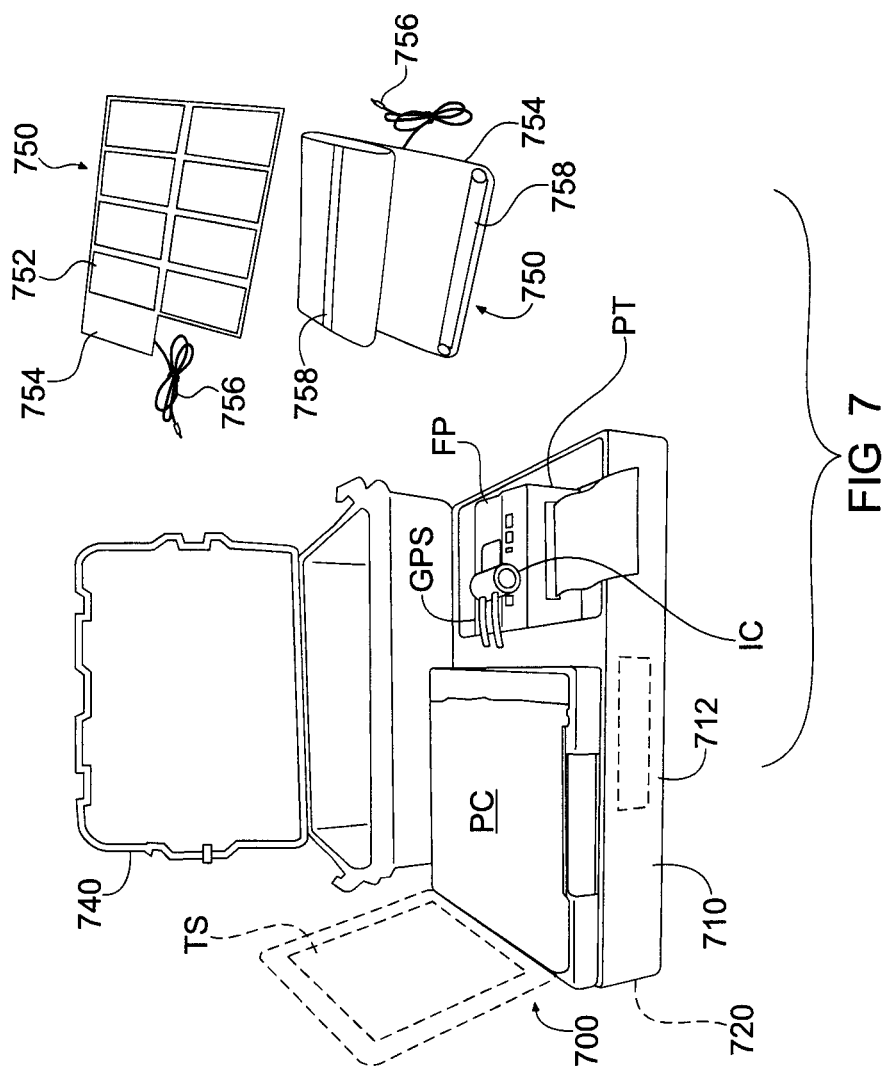

FARM PRODUCT EXCHANGE SYSTEM AND METHOD SUITABLE FOR MULTIPLE SMALL PRODUCERS

This Application claims the benefit of U.S. Provisional Application No. 62/390,283 filed Mar. 24, 2016 and entitled "Web-based Farm Product Exchange System and Solution for Small Farm Holders," and of U.S. Provisional Application No. 62/390,408 filed Mar. 25, 2016 and entitled "Web-based Farm Product Exchange System and Solution for Small Farm Holders," each of which is hereby incorporated herein by reference in its entirety.

The present invention relates to a product exchange system and method. The system and method is suitable for uses inclusive of many small entities, such as farms and other producers.

The United States and many modern industrialized countries are accustomed to having a handful of very large corporate entities, often global-scale entities, that produce the vast majority of the products in the businesses, e.g., industrial and agricultural, in which they operate, e.g., automobiles, aircraft, appliances, consumer electronics, and even foods. Their names are familiar, e.g., General Motors, Ford, Toyota, Honda, Volkswagen, Fiat/Chrysler, Mitsubishi, Boeing, Airbus Industries, General Electric, Whirlpool, Philips, Siemens, General Mills, Kraft, Coca Cola, Pepsi, and the like. But not all countries and not all industries are like that.

In many industries, there are large numbers of producers who produce products in relatively small quantities and who may be spread out over a relatively large geographical area. There may also be a substantial number of customers, e.g., buyers, who while likely being lesser in number, may also be dispersed geographically. The problem is how to connect these widely dispersed groups of producers and buyers who would be likely to do business with each other if they knew who the other party was and could connect with that party. The problem is further complicated by the need that such "connection" can be provided in a way that is efficient and relatively secure, and that employs already available technology and resources.

This problem may not be of great concern in modern industrialized countries, like the United States and western Europe, which enjoy the blessings of well developed infrastructure, e.g., for communication and transport, and so producers and buyers can find each other and engage in business transactions. In farming, for example, US farms tend to be relatively large and highly mechanized if not automated, and farm product buyers also tend to be larger corporate or other entities. But that is not the case in much of the world, particularly in less developed countries.

By way of example, in regions of Africa, Asia and South America there are large numbers of small farms that are farmed by one farmer or one family on a small plot of land out in the bush, in the mountains, or near to a small village. Each farm produces sufficient produce for the needs of the farmer and his family, with excess that can be sold to provide revenue for other needed things. It is difficult for such local farmers to find buyers for their products other than local buyers, and so the price received tends to be less than desired.

On the other hand, there are buyers for such products who tend not to be in the rural and/or remote areas where the farms are located, and who desire to purchase in quantities much larger than any farmer or group of farmers could produce. It is very inefficient and inconvenient for such buyers to travel around the countryside to the individual farms to buy products or to determine and keep track of the likely quantities, quality and harvest times. And it is difficult, if not almost impossible, to procure the large quantities of products desired using such traveling buyers seeking to deal with such far flung producers.

Similarly, there are many small producers of non-farm goods as well that may be scattered over a wide geographic area and who produce their goods in small quantities, use what they need, and trade or sell the excess to support themselves. The goods may include clothing, shoes, hats, baskets, hand tools, kitchen ware, housewares, handcrafts, and the like, but the problems of connecting the producers with potential buyers, of the buyers finding producers and monitoring production, and of facilitating delivery and payment, are substantially the same.

Applicant believes there may be a need for a system and method that could enable such small businesses and such buyers to conveniently and efficiently sell and buy products. It would also be desirable that such system and method facilitate the monitoring of product quality and quantity, product delivery, while also assisting the small businesses in obtaining supplies and other resources that are needed for successfully producing the products.

Accordingly, a method for a product exchange for plural producers may comprise: configuring an electronic device to provide geo-tagged and time stamped image data, receiving registration data from a producer, receiving facility data and product data, and storing the received data in a relational database separate from the electronic device, and repeating the foregoing for a plurality of producers. The method may further comprise receiving registration data and qualifying data from a buyer who is provided product data and may make an offer therefor.

Further, a method for a product exchange may comprise: method for a product exchange for plural producers may comprise: configuring an electronic device to provide geo-tagged and time stamped image data, receiving registration data from a producer, receiving facility data and product data, and storing the received data in a relational database separate from the electronic device, and repeating the foregoing for a plurality of producers. The method may further comprise receiving a request for a supply, equipment or educational material and facilitating the ordering and delivery thereof.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include:

FIG. 7 illustrates an example embodiment of an electronic device usable with the present arrangement.

Figure 1:
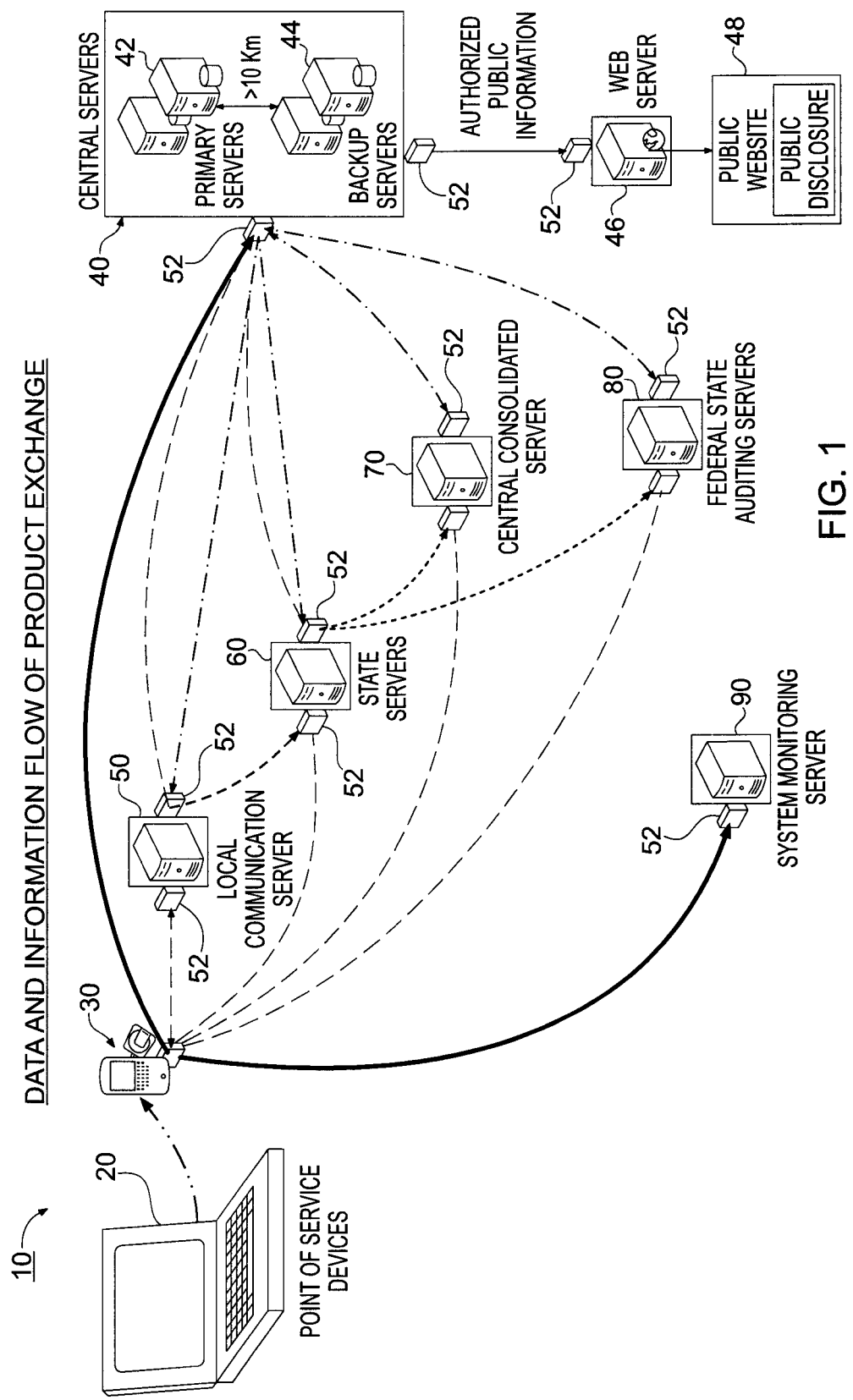
FIG. 1 is a schematic flow diagram illustrating the flow of information and data in an example embodiment of a product exchange system and method according to the present arrangement.

In the Drawing, where an element or feature is shown in more than one drawing figure, the same alphanumeric designation may be used to designate such element or feature in each figure, and where a closely related or modified element is shown in a figure, the same alphanumerical designation may be primed or designated "a" or "b" or the like to designate the modified element or feature. Similar elements or features may be designated by like alphanumeric designations in different figures of the Drawing and with similar nomenclature in the specification. As is common, the various features of the drawing are not to scale, the dimensions of the various features may be arbitrarily expanded or reduced for clarity, and any value stated in any Figure is by way of example only.

DESCRIPTION OF THE PREFERRED EMBODIMENT(S)

By way of introduction, commerce involving relatively large numbers of participants and many relatively small production facilities, e.g., particularly small rural farms and/or small businesses, may extend across a substantial geographic area and operate over a substantial period of time, and so represents a challenge to implement efficiently and effectively. One example involves a large number of small rural farms that may be for a nation, province, state, and/or county, wherein many remote and dispersed sites are employed to provide various crops, e.g., to a large and dispersed population and/or potentially to remote markets.

Monitoring and management of such an endeavor is a gigantic undertaking and can require the gathering of information and data regarding all aspects of the enterprise, e.g., farms, farmers, crops, buyers, offers, supplies, equipment, records and status of farms and crops, conditions experienced by various farms, inventories of crops (both before and at harvest), inventories of supplies and equipment, and the locations of the foregoing, as well as any other data useful and/or helpful to the farmers, the buyers, the managers and/or sponsoring entities.

Such management is made more difficult as the geographic area of such program increases and as the number of participants, e.g., both farmers and buyers served, increases. The degree of difficulty is further increased where the infrastructure of the geographic area involved is less modern and/or less complete. For example, consider how much more difficult the challenge becomes where the infrastructure is less developed and the population less known, such as in less developed areas of Africa and Asia, such as in Nigeria, Kenya or India, where the infrastructure is weak, incomplete or non-existent, or may be damaged, such as after a storm or other natural disaster, or due to lack of maintenance and/or repair.

The present product exchange system and method is arranged, structured and configured to register producers and their business sites and structures, in a way that tends to not be affected by their location and/or being changed, and that makes collected (e.g., captured) information and data (herein, the term "data" is employed generally to refer to all forms and formats of information and data) readily available in identifiable, connected and traceable ways that facilitate buyers and other customers to receive information and data and to consider and engage in business with such producers. Secondarily such system and method preferably should assist in oversight and management of whatever is being monitored and/or managed.

This end is enabled by the correlating of the data to other data that are generally not affected by changes in events and/or time, wherein the other data can include, e.g., biometric identifying data, an electronic device identifier, geographic identifying data, and date and time data, and in particular one or more unique identifiers that are associated with particular participants, locations and/or events. Further, where changing conditions can affect the arrangements considered and/or entered into, e.g., the selling and buying of products, data representative of the conditions at defined locations and times preferably is collected and is correlated to other related data, so that an accurate representation of various locations, conditions and situations can be maintained, and monitored, and managed, wherein the one or more unique identifiers provide at least one of the possible linking bases for such correlation. The unique identifiers typically include, e.g., the unique identifier of an electronic device utilized by a participant, or biometric data identifying a participant, or a unique identifier generated from biometric data identifying a participant, and the like, thereby providing a unique association with a particular participant.

While the product exchange system and method herein is described primarily in terms of a particular example, e.g., of farmers and small geographically diverse farms and of buyers seeking quantities of farm produce greater than any farm or group of farms in a given local area could produce, the system and method is directed in general to multiple small businesses producing products and to potentially multiple buyers of such products, whether the product be, e.g., farm produce, animals, minerals, timber, natural resources, machinery and/or parts thereof, or any other product.

FIG. 1 is a schematic flow diagram 10 illustrating the flow of information and data in an example embodiment of a product exchange system 10 and method 10 according to the present arrangement. Product exchange system and method 10 acquires producer and product data at various locations, e.g., locations at which point of service devices 20, 30 are located, and, after relating that data to local geographic data markers, and particularly to respective unique identifiers, e.g., of electronic devices 20, 30, transmits the data to various servers at different locations 40, 50, 60, 70, 80, 90 whereat it may be evaluated and/or otherwise processed to register, monitor and/or manage the products and producers to which the data pertains. Certain processed data and/or certain selected data may be made available to other agencies, e.g., via a state or federal monitoring server 80 of a system monitoring server 90, and/or to the public 48, e.g., via a web server 46 providing one or more web sites 48 accessible to authorized personnel and/or to the public.

Data capture and/or collection is typically provided by portable digital electronic devices 20, 30 that are deployed with personnel in the field or available to producers. Data collected and/or captured by electronic devices 20, 30, which may include biometric data, geographic data, location data, personal data, image data, entered data and other data, or a representation thereof, and/or a unique identifier, e.g., of an electronic device 20, 30, is communicated to central servers 40 as well as to one or more local communication servers 50, which may be owned, controlled and/or operated by or for one or more businesses, local governments or their agencies, to one or more regional or state servers 60, which may be owned, controlled and/or operated by or for one or more businesses, or by county, state or provincial governments or their agencies, to one or more central consolidated servers 70, and/or to one or more federal or state auditing servers 80, which may be owned, controlled and/or operated by or for one or more national or federal governments or their agencies. Typical agencies may include agricultural departments and commerce agencies at any and/or all governmental and/or organizational levels, as well as by non-governmental organizations, publically owned entities and/or private entities. Various centers 50-80 may also be owned, controlled and/or operated by or for private or corporate organizations, non-governmental organizations (NGOs), and/or other entities. Each server 40, 50, 60, 70, 80, 90 preferably includes appropriate security devices and software, including but not limited to one or more firewalls, which are represented by smaller rectangular boxes generally identified by 52.

Data communicated from one or more of centers 50, 60, 70 and 80 to one or more of electronic devices 30 may include and preferably does include applications software (sometimes referred to as an "app" or as "apps") as well as confirmations of data received, date-time stamps, hashing and other encrypting data, requests and/or reminders for data and/or reports and/or actions, and the like. Data communicated between and among centers 50, 60, 70, 80 typically includes coordination and communication in addition to requests, responses to requests, actual data relating to situations as described. All data and communication is preferably hashed and/or encrypted, digitally signed, and date-time stamped, e.g., for security and privacy, and preferably includes one or more of the unique identifiers associated therewith.

The associating and/or correlating of geographic and/or location and/or other data with an actual location or place may be referred to as "geo-tagging" or a applying a "geo-tag" and the resulting data may be referred to as being "geo-tagged." The associating and/or correlating of data with a known accurate date and/or time, e.g., as from a server, communication network and/or GPS signal, may be referred to as "time stamping" or "date stamping" or "date-time stamping" and the resulting data may be referred to as being "time stamped" or "date stamped" or "date-time stamped," and each of these terms is intended to include any or all of the other terms unless expressly indicated to the contrary.

Preferably each item of data, or a representation thereof, is both geo-tagged and time-stamped at its source, and both the geo-tag and time-stamp are maintained with that data wherever it may be used and stored. The linking of geo-tag and date-time stamp with the data serves as a verification tool, e.g., to avoid confusion as to location and/or time, to identify duplicate registrations and duplicate data entries, to identify mistaken or false or fraudulent data entry, thereby to reduce the likelihood of processing a mistaken or false entry and/or request. Preferably, the unique identifier is likewise associated with and maintained with such data, to substantially the same ends.

Electronic devices 30 may include, e.g., electronic devices 30 issued by entities that are involved in addressing the situations and/or locations in view, and/or may include electronic devices 30 that belong to the people who are involved with the locations, situations and/or circumstances in view, e.g., farmers, producers, and the like, and persons otherwise involved, e.g., suppliers, shippers, finance entities, delivery entities, and the like. Because the arrangement of product exchange system 10 and method 10 is preferably independent of any particular type or kind of electronic device 30, commonly available devices such as smart phones, tablet computers, portable computers and the like, may all be utilized, thereby to provide both flexibility and an adaptability for product exchange system 10 and method 10 to operate in a wide variety of situations and circumstances without the need for specialized field equipment and/or the centralized issuing and control thereof, although either may be utilized when and where desired.

It is anticipated that a large number of users, e.g., producers and buyers, will engage with system and method 10 using a smart phone or a tablet device or other electronic computing device. Typically, the smart phone or tablet device is configured to operate with system and method 10 by a software "app" that may be downloaded directly to the smart phone or tablet device or other electronic computing device. In many developing countries, the cellular network, whether relatively primitive or well established, may be the primary communication infrastructure available, and a village may have communication connection with the outside world and the Internet only through a local cellular base station to which they may connect via WiFi, Bluetooth, or other typically local communication protocol.

The GPS or other locating device of electronic devices 30 may take various forms. For purposes of locating a producing facility, e.g., a farming plot, a very precise location is not necessary, e.g., so long as the accuracy is sufficient to distinguish between adjacent facilities and/or provide an estimate of the size thereof. Typical hand held GPS receivers and/or smart phones 30 typically employ a position locating receiver and algorithm that operate in response to a single frequency locating (e.g., GPS), signal which can provide locating accuracy to within a few meters or less which typically is sufficient for locating the corners of facilities, e.g., farm plots and fields. Where greater precision is required, a real-time kinematic (RTK) locating device may be employed to obtain locating accuracies within a few centimeters as might be desirable for marking boundaries and/or a static GPS as used for geodetic surveying may be employed is locating accuracies to within a few millimeters are needed.

Similarly, the unique identifier which serves as the linking identifier relating various data relating to a particular person and/or location and/or device, may be centrally provided, e.g., such as by unique identifiers that are contained in or derived from data that may be acquired by electronic devices 30 capturing an image of such unique identifier, or may be generated in the operation of product exchange system and method 10 in the field, e.g., such as by generating a unique identifier from data relating to the location, situation, device and/or persons involved. In the latter instance, geo-tagging data, date-time stamp data and/or individual personal data may be combined and/or otherwise employed to generate unique identifiers. The generation of unique identifiers may be a function provided by, e.g., application software that is downloaded to electronic devices 30, or by data stored therein, e.g., during manufacture and/or set up, and/or may be generated from, e.g., biometric identifying data and/or geographic locating data.

Central servers 40, preferably including both primary servers 42 and one or more backup servers 44, are employed to receive the data communicated from electronic devices 30 and from centers 50, 60, 70 and 80, and under control of operating authorities, authorized public information may be released via one or more web servers 46 to one or more public web sites 48 where it is disclosed and available to the public, e.g., via the Internet, communication networks, wireless devices, and the like.

Communication with, between and among devices and servers and sites 20-90 is preferably via a secure communication link or links, such as by transmitting encoded, encrypted and/or hashed data. Communication is typically via an intranet, ethernet, WAN, LAN, optical fiber, or other suitable network, via an ad hoc network, via direct and/or network connections, via WiFi, Bluetooth or other local links, via a WiFi/VSAT bridge, via the Internet, via optical communication, via wireless communication, e.g., a microwave, cellular or other radio link, via a satellite link, via general packet radio service (GPRS), or via any other suitable communication link, or via any combination of some or all of the foregoing. Encryption preferably includes hashing the data and applying a standard encryption algorithm, and all data generated and/or produced is subject to similar hashing and encryption. Preferably data is hashed and encrypted when stored and when communicated, both for security in transmission and against alteration and/or corruption, whether accidental or intentional.

With the foregoing product exchange system 10 infrastructure large numbers of widely dispersed producers, e.g., farmers of small farms and local goods producers, can register their businesses, e.g., farms and shops, and the products that are and will be produced thereby. With the foregoing product exchange infrastructure 10, plural buyers and/or customers can access data relating to the businesses and products available, consider them for their purposes, and can make and receive offers to enter into one or more business transactions relating thereto. In addition, updated information and data is periodically entered by the businesses and may be accessed by the buyers so that the transaction can be timely and efficiently completed or, if unexpected and/or unacceptable circumstances intervene, alternative transactions may be considered and/or effected.

Thus, the disclosed product exchange system and method 10 can provide an exchange among many widely dispersed producers and buyers that represents and can approximate a product exchange environment where producers and buyers are physically close.

Figure 2A:
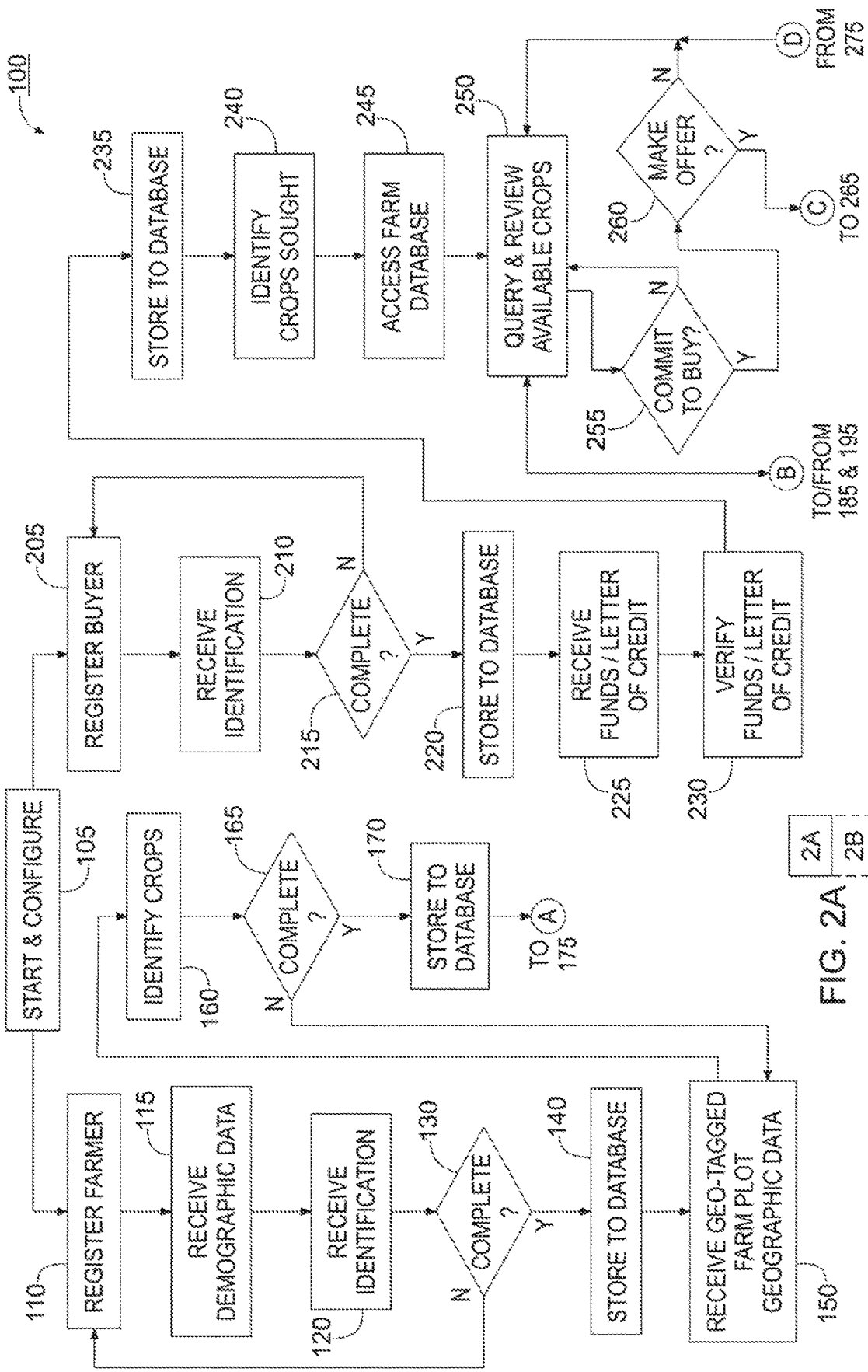
FIGS. 2 and 2A are a schematic flow diagram illustrating the process associated with the example product exchange system and method.

FIGS. 2 and 2A are a schematic flow diagram illustrating the process 100 associated with the example product exchange system and method 10, and extends over two sheets of drawing. Links or flow connections between the sheets are indicated by letters, e.g., A, B, C, D, on each sheet that are encircled for clarity. Process 100 may involve any number of producers and any number of buyers, from a very small number, e.g., 2-3, to a very large number, e.g., thousands or tens of thousands or hundreds of thousands, and the system 10 hardware can be expanded at any time and from time to time as may be necessary or desirable to accommodate the numbers of producers and the numbers of buyers that participate and/or are expected to participate.

Product exchange process 100 starts 105 by separating into what is illustrated for clarity as two separate paths that need not be performed in parallel, but each can progress at its own particular rate and even in its own particular order. The path to the left relates to each of many small businesses and producers, while the path to the right relates to plural potential buyers and buyers of the products of the small businesses, at least until interactions between the two paths begin, e.g., as when transactions between the producer small businesses and the buyers commence. In fact the many small businesses participating are each individually involved in the process path to the left while the plural buyers are each individually involved in the process path to the right, whereby a product exchange beneficial to all, e.g., plural producers and plural buyers, can be established and maintained. It is noted that producers, e.g., farmers, and buyers can interact with system 10 using an electronic device 20, 30, so that process 100 is performed as described.

It is noted that registration steps 110-140 and 205-235 may be and preferably are performed utilizing an electronic device 20, 30 that is configured to perform the relevant steps of process 100, e.g., by performing a downloaded software application (herein sometimes referred to as an "app") or by being preprogrammed or by being a dedicated registration device 20, as described herein. It is also noted that the data acquired and/or the data stored, including but not limited to images, are representations of a real physical object, e.g., a person or his/her physical characteristic such as a facial image, eye scan, and/or fingerprint, or an actual physical place or thing, e.g., a farm plot, a crop, equipment and/or supplies, and the processing of such representational data can produce representations of modified and/or changed states thereof.

To that end, the step 105 which starts process 100 typically includes initially downloading application software and running the app to configure the electronic device 20, 30 for as many participants as need to do so, both producers and potential buyers, and once so configured, electronic devices 20, 30 can continue thereafter to operate in product exchange system 10 and method 10. The software app may be a common app for both producers and buyers who in configuring their electronic device 20, 30 self identify as a producer or as a buyer to install that aspect of the app that is operative to that identified role, or may be a separate app provided for producers and another separate app provided for buyers. Step 105 may also include downloading and installing updated application software from time to time, although software updates may be provided at any time and from time to time when an electronic device 20, 30 is in communication with one of servers 40-90.

The left hand path for the small businesses, small producers, e.g., herein represented by farmers of small farms, begins with registration 110 of the farmer which includes receiving 115 demographic data, e.g., name, address, telephone, e-mail and/or text message addresses, and the like. Registration 110 also includes receiving identification 120 which may include the identification of the electronic device 20, 30 used, e.g., an unchangeable internally stored device identifier and/or the cell phone number used by the device, a national identity card and/or driver's license and/or other government issued identification information, and which also preferably (but may not be required to) includes a biometric identifier, e.g., a facial image, a fingerprint (of one or more fingers), an eye scan and the like, or a combination thereof, and or a unique identifier generated from such biometric identifying data. If the information received for registration 110-120 is not complete 130, process 100 loops back via path 130-N to registration 110 to seek the missing information, and if registration 110-120 is complete 130, process 100 proceeds via path 130-Y to store 140 the registration information in a registration database, thereby completing registration of the small business.

Once registered 110-140, a producer proceeds to enroll 150-170 his production facility, e.g., a plot of land for a farmer. As described below, a series of images are captured by an electronic device 20, 30 to define the corners of the plot or other facility by appearance as well as by the precise geographic location of such corners as determined by a locating function, e.g., a GPS locator, of electronic device 20, 30. Such geo-tagged and date-time stamped images are received 150, e.g., at server 40, along with an identification 160 of the product being produced, e.g., the crop being grown on the plot. If the received 150, 160 data is consistent and complete 165, path 165-Y is followed to store 170 the complete facility and product data in the database.

The database, e.g., stored on server 40 as well as on backup and/or parallel servers, is a relational database in which all related data is linked relationally, including the identity of the participant, the geographic location of the participant and of the production facility, and the product, e.g., the farmer's crop. Such data may be linked by any one of several data that is common to the related data records, e.g., by identity, by GPS coordinates, by the identifier of the electronic device 20, 30, and/or by another unique identifier.

Thereafter, geo-tagged images of the crops growing on the farmer's plot are received 175 and may be monitored and/or compared with previously received data, e.g., earlier images, to verify progress toward harvest or completion. As the progress and condition of the crop and/or product becomes better known, the producer can estimate 180 the quantity of product that will be produced, e.g., a farmer estimates the quantity of his crop, and set 180 the price at which he is willing to sell the product, and submit that data to be stored 185 in the database. It is preferred that as new and/or more current data becomes available, that the database be updated 185 to include the new data, which is shown in several places in the process 100, but which may be done at other times as well.

While the producer, e.g., farmer, is instructed to periodically provide 175 updated data, it is preferred that a notification and/or reminder be provided 175 to improve the frequency, accuracy and reliability of the data stored 170, 185 in the database. Such notifications and/or reminders can be generated centrally, e.g., at server 40 or at a central server 60, 70 or at an auditing or monitoring server 80, 90, and sent to the appropriate electronic device 20, 30, e.g., as identified by its device identifier, by a unique identifier and/or by location as indicated by the geo-tags associated with the relevant data, as may be convenient.

Product, e.g., crop, updates are received 175 periodically throughout the growing season until the crop is ready to be harvested 190 and is harvested 190, or, e.g., a product is completed 190. If it is not yet time to harvest or if a product is not yet completed, path 190-N is followed to continue generating and receiving 175 updated crop or product data, e.g., geo-tagged images, to updated 185 the database. Once the product is finished, e.g., the crop is harvested, path 190-Y is followed to update 195 the database with that data, which preferably includes not only the fact of harvest, but also the quantity harvested and preferably a geo-tagged image of the harvested crop or completed product to be stored 195 in the database.

All data received subsequent to the initial data, as well as additions and/or updates to the data stored in a data record in the database, are preferably verified by comparison, e.g., for consistency, with previously provided data. For example, the geo-tagged images received periodically 175 for crop data status can be checked by their GPS coordinates with previously received geo-tagged data for consistency, e.g., that they are images of the same farm or plot or facility as represented by the geo-tagged location, and crop growth and product progress may also be checked for consistency with previous data, e.g., using their respective date-time stamps in conjunction with known data on precipitation, sunshine and cloud cover, and crop growth characteristics from other sources, or known data on product production characteristics.

Having thus traced the process 100 for the producer from registration 110-140 through completion, e.g., harvest 190-195, we will now consider registration 205 and subsequent steps as pertaining to a buyer or customer. Buyer registration 205, receiving 210 buyer identification, determining whether it is complete 215, and storing 220 the buyer registration and identification data, can be and preferably is substantially the same as that described above for the producer or farmer, with like identification and verification processes. While the facilities and ability to produce is relevant for the producer, it is the resources and ability to complete a transaction, e.g., pay for the products, that is relevant for the buyer.

Buyers are qualified by submitting 225 a funds deposit or letter of credit or other indicator of the buyer's ability to pay and receiving 225 such items is the step 225 for process 100. Once received 225, the deposit of funds or other payment ability is confirmed 230 and/or the letter of credit is verified 130, and the data relating thereto is stored 235 in the database where it is relationally linked to the buyer's registration and identification.

Having been registered and qualified 205-235, the buyer is now eligible to seek the products he desires to obtain and their availability from the registered producers, e.g., farmers. The buyer begins by identifying 240 the products sought, e.g., using drop down menus and/or word or other searches that are provided by the software app, e.g., on the electronic device 20, 30 utilized by the buyer. The buyer may access the product exchange system 10 via the Internet or other network, or by wireless or other communication links.

Having identified 240 the crops and/or products sought, the buyer accesses 245 the producer database which contains the records of the facilities and products, and the status of production and completion provided by all registered producers, e.g., accesses 245 the farm database which contains the records of the farms and crops, or similar data relating to the production of goods, and the status of the crops and harvest or the goods. The buyer submits 250 a query to the database 185, 195 which returns all "hits" meeting the conditions of the buyer's query. A query 250 may specify the products sought, the quantities thereof, the prices or ranges of prices, and the desired delivery locations and dates, e.g., in the case of farm products, the crops sought, the estimated and/or harvested quantities thereof, the prices or ranges of prices, and the desired delivery location and dates, as well as other relevant criteria.

The queries typically return matches or "hits" 250 which the buyer can review 250 in order to make a decision whether to commit to buy 255 the product and to make an offer 260 to buy the product. The return from the query 250 may, and probably more often that not will, contain data relating to the products of more than one producer which provides to the buyer the choice to buy from none, some or all of the producers and/or to buy selectively based upon, e.g., price, quantity and delivery date. In the case of farm products, the return 250 might result in the buyer selectively making a commitment 255 and/or a present offer 260 selectively, e.g., based upon the location of the farm, the price, the estimated and/or harvested quantity, the crop quality, the delivery date and delivery location, as may be important to any particular buyer or buyers.

If the buyer commits to buy 255 the product, path 255-Y is followed whereupon the buyer can then decide whether to make an offer 260 at the present time to buy the product. If the buyer does not commit to buy 255 or does not make an offer 260 at this time, process 100 follows path 255-N or 260-N to return to the query database 250 step. If the buyer does make an offer 260, then path 260-Y is followed to step 265 to store 265 the fact and terms of that offer in the database, and the offer is transmitted 270 to the producer or producers of the products, e.g., the farmer or farmers, to which the offer pertains.

The producer, e.g., farmer, receiving 270 an offer via an electronic device 20, 30 has the option 300 to accept 300-Y or to decline 300-N the offer. If the offer is declined, path 300-N is followed and the producer may make 275 a counter offer. This may relate to the price ($) offered and may or may not include other terms such as quantity and delivery yet to be agreed. The offer could be at a price less than that listed 180 by the producer or could be for a different quantity than that listed 180 by the producer. The declining of an offer and the counter offer 275, if any, is stored 280 to update the database. If the buyer does not accept 285 the counter offer, path 285-N is followed and process 100 returns to step 250 and the buyer may make 250 a new query and/or make a different offer. If the buyer accepts 285 the counter offer path 285-Y is followed or if the producer accepts 300 the buyer's offer path 300-Y is followed, and then in either instance the accepted 285, 300 transaction is stored 305 in a record in the database.

Once the accepted transaction is recorded 305, funds sufficient to complete the transaction are placed into escrow 310 from the funds deposited 225 or letter of credit or funds availability received 225 previously, thereby securing the buyer's ability to pay when the transaction closes, e.g., at delivery 355. Then a delivery is established 315, e.g., a date and location is specified by the producer or the buyer, and if agreed 320, then path 320-Y is followed and the complete transaction is recorded 330 to the database. If delivery cannot be agreed 320, then the transaction is cancelled 325 and stored in the database, and process 100 returns the buyer to step 250 from where further queries and/or offers may be made.

Following completion 190 of production, e.g., harvest 190 of a crop, and updating 195 the database, the next step is delivery 350 of the product or crop at the appointed time and place. Process 100 waits for that delivery 350 event as represented by the crop delivered 355 decision. If not delivered 350, path 350-N is followed to await delivery. When delivery 350 occurs, path 350-Y is followed and the delivery event and data is stored 360 to update the database, which determining that all aspects of the transaction have been done, e.g., the product has been delivered, transmits 365 payment to the producer and updates 370 the database accordingly, whereupon process 100 ends 390 regarding that completed transaction.

The entity or person involved in making and/or accepting delivery 350 may be a participant in the transaction or may be an independent third party, e.g., a warehouse or storage facility, that may provide an independent report as to the quantity and/or quality of the products, e.g., crops, tendered for delivery and/or delivered. If there is a reported discrepancy in either quantity or quality from that specified in the accepted offer, then the transaction may be suspended and/or an adjustment, e.g., a price adjustment, may be made to accommodate the difference in quantity or quality, and such adjustment would be stored 360 in the database.

It should be understood that even though process 100 has ended 390 regarding a particular completed transaction, the producer and the buyer who engaged in that particular transaction may remain actively engaged in process 100 with regard to different products and/or times and circumstances, as may other producers and buyers.

It should also be understood that while the foregoing description has followed one producer and one buyer through process 100, in actual usage it is expected that a large number of producers will be engaged in performing process 100 and will be performing different steps in that process at any given time, and that a large number of buyers will also be engaged in performing process 100 and will be performing different steps in that process at any given time, whereby an exchange for selling the products of a plurality of producers and the buying of such products by a plurality of buyers is established and operating.

Figure 2B:
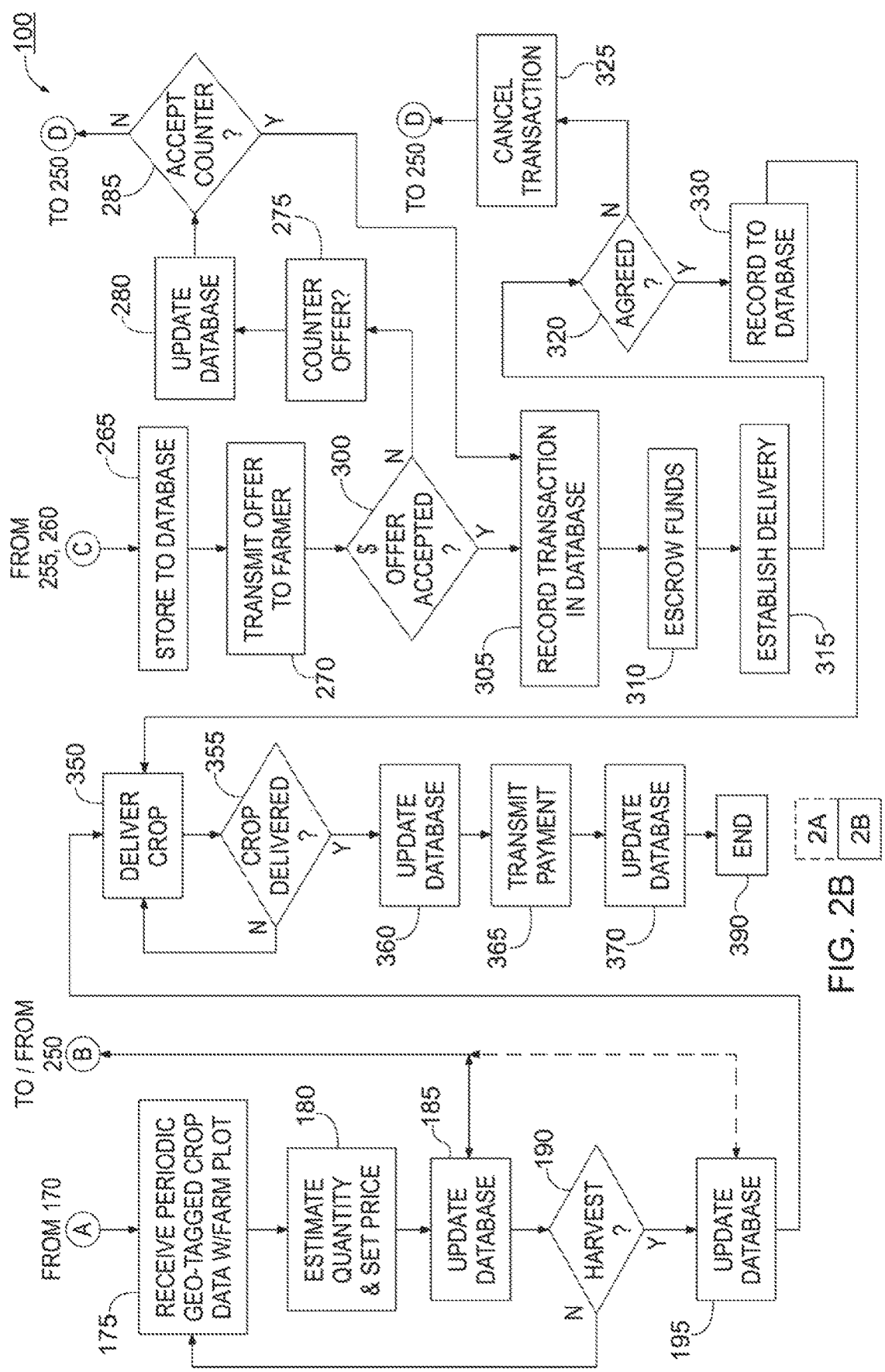
Figure 3:
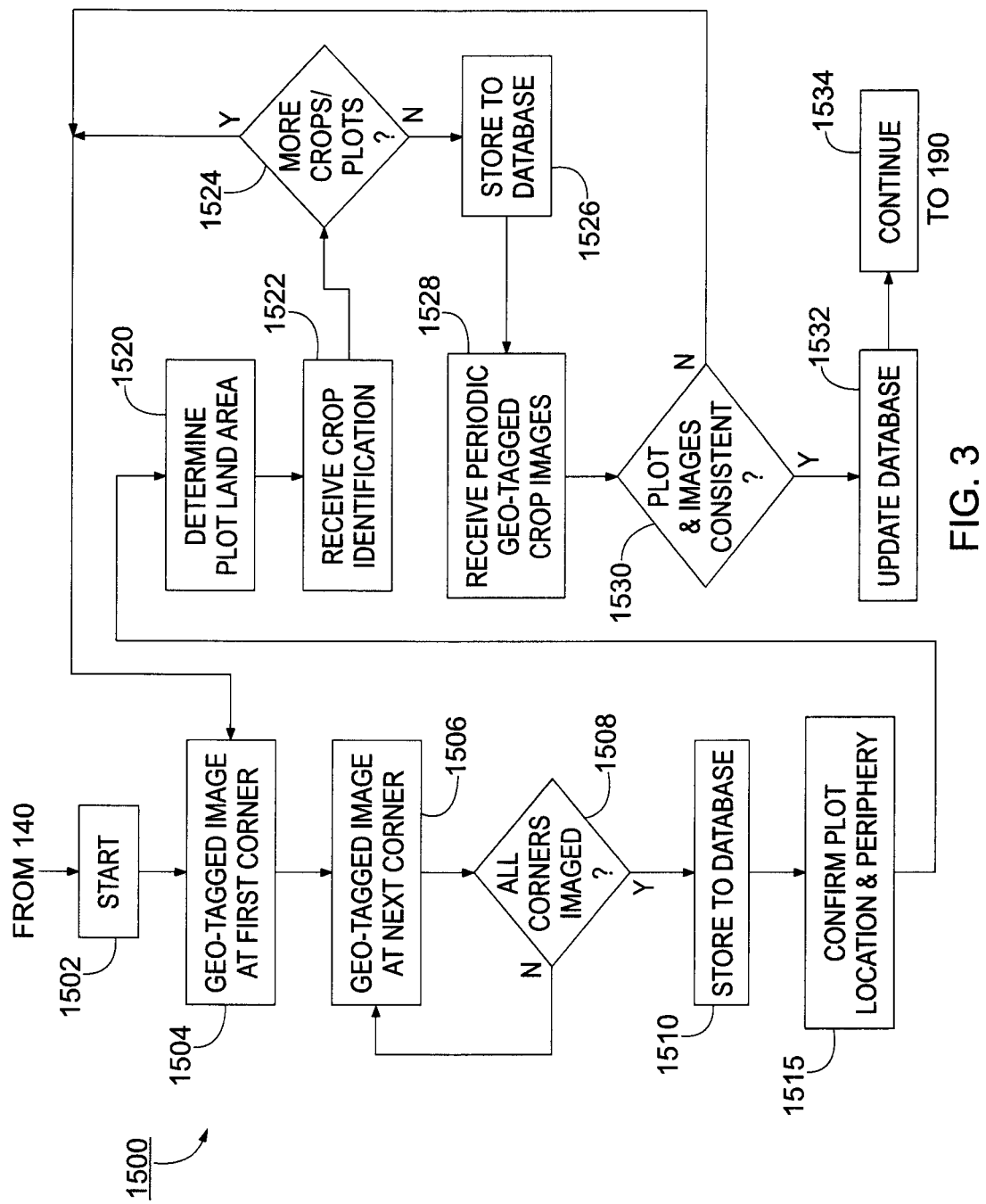
FIG. 3 is a schematic flow diagram illustrating certain aspects associated with the example product exchange system and method of FIG. 1 and the product exchange method or process of FIG. 2.

FIG. 3 is a schematic flow diagram illustrating certain aspects associated with the example system and method 10 of FIG. 1 and with the product exchange method or process 100 of FIG. 2. In particular, FIG. 3 illustrates an example embodiment of a detail aspect 1500 that is associated with process 100, e.g., with regard to steps 150-185 thereof. Detail 1500 relating to steps 150-185 starts 1502 from step 140 of process 100 above, regarding generating 150 the geo-tagged data describing the facility or farm plot which entails a sequence of steps to define the farm plot by marking the corners thereof. It is noted that a producer, e.g., farmer, can interact with system 10 using an electronic device 20, 30, so that process 1500 is performed as described.

While one may think of a plot as being rectangular in shape and having four corners, as may be the case where farming is done on large plains whereon plural rectangular fields of like or different sizes may be defined, e.g., as in the Great Plains regions of the United States, that is not the case in much of the world where people farm wherever a suitable plot of land may be found. Thus, farmed plots may have three, four, five, six or more corners, and may be irregularly shaped instead of being in a recognizable polygonal shape, such as a rectangle or trapezoid.

For this reason, process 1500 provides for identifying and geo-tagging an arbitrary number of corners. A geo-tagged image is taken 1504 at a first one of the corners of the plot, e.g., at which ever corner the farmer decides to begin. Then a geo-tagged image is taken 1506 at a next corner in sequence around the periphery or perimeter of the plot and is repeated until a geo-tagged image has been taken 1504, 1506 at each one of the corners thereof in sequence. If all corners have been imaged 1508, then path 1508-Y is followed and the geo-tagged corner images are stored 1510 to the database. If not, then path 1508-N is taken and the next corner is imaged 1506. The image at each corner is to be taken, and preferably is taken, looking toward a central part of the plot so that the images depict what is present on the plot that is being defined by its corners, as viewed from the respective corners. Each image is geo-tagged and date-time stamped as it is captured so as to provide both location and temporal indications to accompany the image itself.

When all of the corners have been imaged 1506, 1508 and stored 1510, e.g., to a central server 40, the location and periphery or perimeter of the plot is confirmed 1515, e.g., that the distances and timing between and among all of the images is consistent with a reasonable plot and/or with any identifying information that the farmer may have provided in registering 110-140. The location of the plot may be derived from the geographic locations of the corners thereof, e.g., by a simple averaging of their respective latitudes and longitudes wherein the average latitude and longitude will generally be at a location relatively near to a central location within the plot.

The area of the plot of land is determined 1520 by processing the geographic coordinates, e.g., GPS coordinates, of the corners of the plot for calculating the length or the periphery (perimeter) of the plot and/or the area of the plot, and optionally determining whether that data is consistent with the data provided by the farmer when registering. The respective GPS coordinates, e.g., typically latitudes and longitudes, of the corners define a polygon that is the periphery or perimeter of the plot, e.g., often a rectangle or trapezoid, from which the peripheral length and/or the enclosed area of the plot is easily calculated.

The farmer identifies 1522 the crop that is growing or that will be grown on the plot, which data is received 1522 and stored in the data base, either as received or after the process is partially or fully completed, and related to the registration of the farmer and plot. If a crop is growing, the crop may be verified against the geo-tagged images of the plot. Certainly crops such as corn, soybean, bananas, coffee, cotton and the like can easily be identified from the images of the plants growing on the plot, either manually or via image recognition techniques, and either by sampling or more frequent checking. Moreover, extension of such techniques may be employed to check the data relating to a plot for consistency, e.g., as a verification that a claim is at least feasible. For example, using the area of a plot, the type of crop being grown, and historically known ranges of product produced per unit area, the farmer's estimates of the crop that will be available may be checked for basic consistency. In addition, historical records of sunshine, rainfall and the like during the time period when the crop is being grown may be taken into account to further refine such estimates used to verify consistency.

Having completed the identification of a plot by its corners and a crop thereon, process 1500 seeks an indication of whether there are more crops and/or plots 1524 that the particular farmer desired to enter and define. If there are more crops and/or more plots, path 1524-Y is followed to step 1504 to begin the next sequence of geo-tagged images of the corners and/or of the crops. If there are no more crops 1524 to be entered and there are no more plots 1524 to be entered, then path 1524-N is followed and the geo-tagged images and other data relating to the plot and crops is stored 1526 to the database.

For purposes of monitoring agricultural progress and of verifying that a farmer is indeed growing the crop identified on the registered plot of farm land, it is preferably required that geo-tagged images of the plot and crop be made 1528 periodically and received 1528 at the central server 40 and/or other servers. The geo-tagged periodic images are preferably compared to the geo-tagged images already stored in the database for consistency 1530, e.g., based upon geographic location, e.g., from the GPS coordinates of the geo-tag, and/or comparison of crop from the images and/or of the progress of such crop based upon image recognition and growth, e.g., as determined from images taken at different times. In any event, the received 1528 geo-tagged periodic images and consistency tests 1530 are stored 1532 to update the database which thus contains the original characteristics of the plot received with registration and the periodic updates thereto received 1528 from time to time. Consistency tests 1530 may employ the same techniques described above in relation to plot and crop evaluations 1515 and 1530.

Example detail process 1500 ends 1534 by returning to and continuing in process 100, e.g., at step 190 thereof. It is noted that other variations of steps 150-185 may be utilized as may variations in the sequencing and details of the steps 1504-1590 of detail process 1500.

Figure 4A:
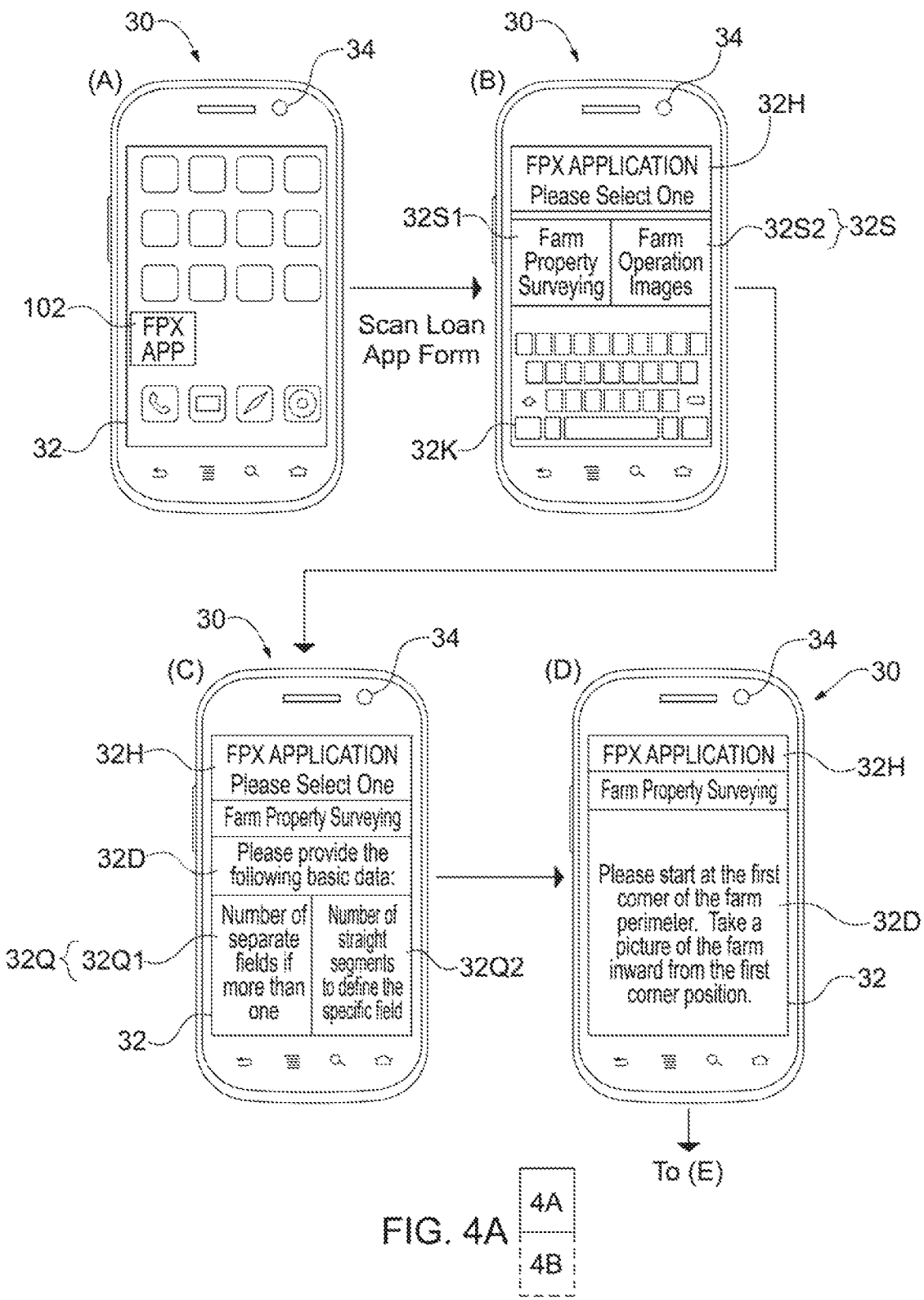
FIGS. 4A and 4B include views (A) through (H) which are a series of illustrations of screen shots for an example electronic device software application employed with the example system and method herein, and FIG. 4C includes two views thereof relating to an example surveying feature.
Figure 4B:
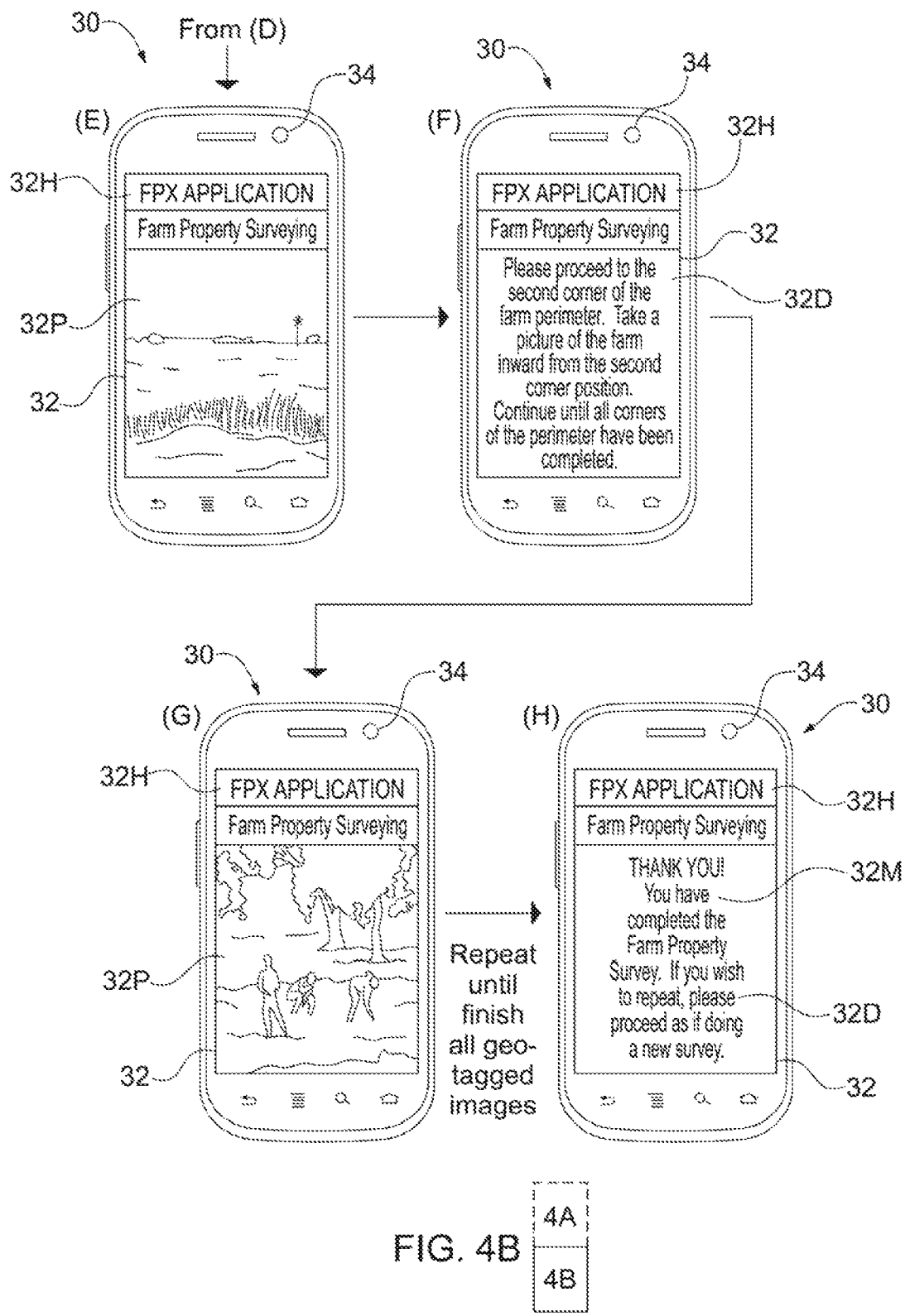
Figure 4C:
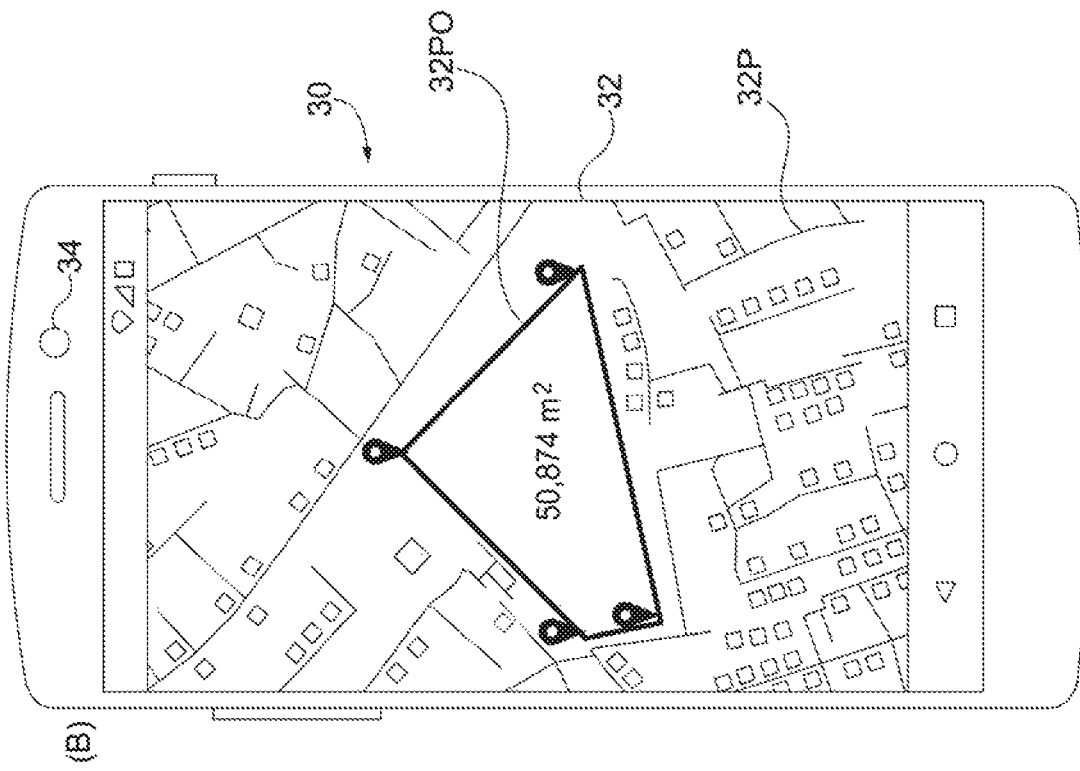
Figure 4C:
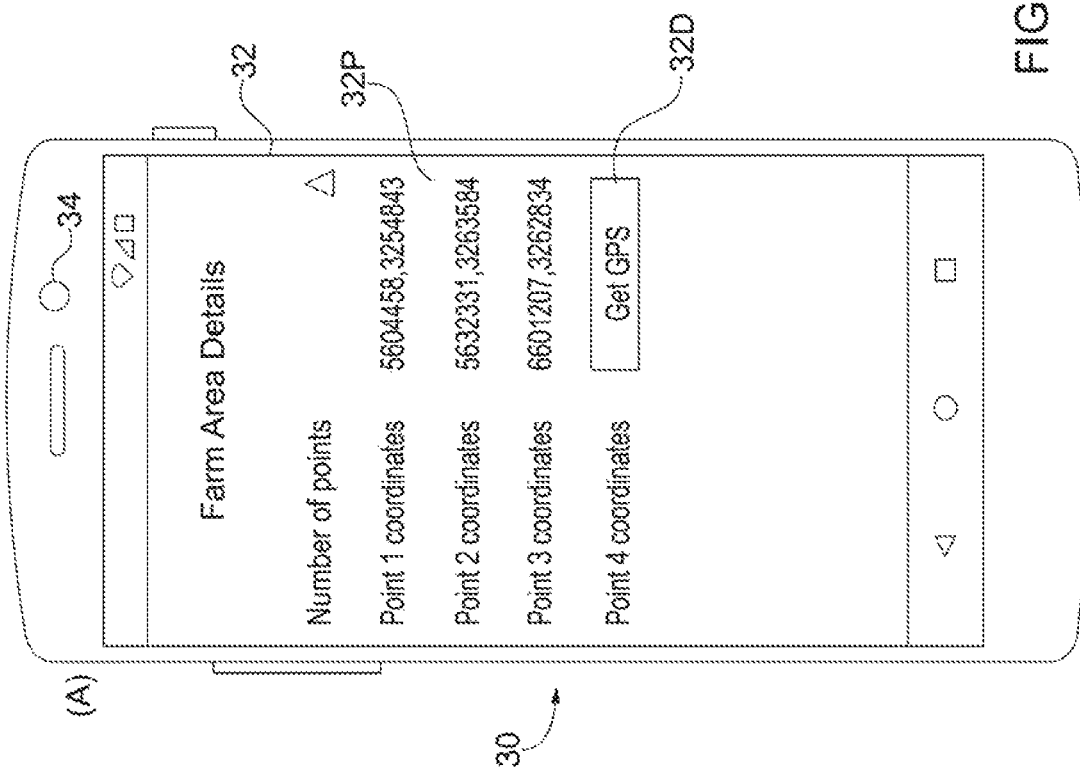

FIGS. 4A and 4B include views (A) through (H) which are a series of illustrations of screen shots for an example electronic device 20, 30 software application employed with the example system and method 10 herein, and FIG. 4C includes two views (A) and (B) thereof relating to an example surveying feature. The example screens 32 herein are displayed on an example of a typical smart phone serving as an electronic device 20, 30, which may be of a different type and/or kind, each having a display screen 32, preferably a touch screen 32, on which are displayed different screens 32. View (A) of FIG. 4A is of the desktop or basic screen 32 wherein a plurality of various square-like icons are displayed representing various software applications which may be accessed by touching the appropriate icon. One icon 102 labeled "FPX App" provides entry to the system and method 10, 100 described. Each example screen typically has a header 32H that identifies the farm product exchange app and may display an instruction, response, message and/or data item 32D, 32M, 32P, 32Q to the user.

View (B) of FIG. 4A is a screen 32 providing a number of selections 32S for entry into two or more different functional aspects of the system and method 10, 100, e.g., into a Farm Property Surveying aspect 32S1, e.g., substantially for engaging a registered producer in some or all of steps 1150-170 described above, or into a Farm Operation Images aspect 32S2, for engaging in some or all of steps 175-195 described above. Device 30 at times displays a keyboard 32K on touch screen display 32 when appropriate or when activated by the user, and the imager 34 thereof may be employed for obtaining images 32P of scenes, e.g., of a farm, field, plot and/or crop, and/or of specific objects, e.g., an identification card or credential, a form containing information to be scanned or otherwise captured by the imager 34 of electronic device 30.

Views (C) through (D) of FIG. 4A and views (E) through (H) of FIG. 4B relate to various aspects of the Farm Property Surveying feature described, e.g., in FIGS. 2A, 2B and 3, while views (A) and (B) of FIG. 4B illustrate return responses 32P, 32M confirming the survey sequence. View (C) requests 32D, 32Q certain data items relating to the plot to be surveyed, e.g., the number of separate fields to be surveyed 32Q1 and the number of corners or line segments that will define the periphery or perimeter of the field 32Q2, and therefore its location and area. View (D) is an instructional screen 32D directing the user to begin the surveying at the first corner on the perimeter of the field and to take an image of the field inward from the first corner position, e.g., looking into the field. View (E) is a response screen 32P displaying the image of the field the user has taken as confirmation that the image has been captured and allowing the user to confirm that the image is correctly taken.

View (F) is another instructional screen 32D directing the user to continue the surveying at the second, e.g., next, corner on the perimeter of the field and to take an image of the field inward from that corner position, e.g., looking into the field, and to continue until images have been taken and captured from all of the corners around the complete periphery or perimeter. View (G) is a response screen 32P displaying the image of the field the user has taken as confirmation that the image has been captured and allowing the user to confirm that the image is correctly taken. Views (F) and (G) are repeated sequentially until images have been taken and captured at all of the corners of the field, the number of which is known from the data previously entered by the user in response to queries made via responding to the screen 32D, 32Q of view (C).

Once images have been taken and captured at all of the corners, a confirmation message screen 32M, e.g., that of view (H), is presented to confirm that the farm property survey has been completed, and an instruction 32D provided that if another plot or field is to be surveyed, then the foregoing process steps should be repeated for each plot or field.

Optionally, but preferably, the results of the survey should be presented to the user by one or more display screens 32 that, e.g., report and confirm the data submitted and captured. To that end, view (A) of FIG. 4C illustrates an advancing list 32P of the GPS coordinates of each corner or the plot or field as each corner is surveyed, e.g., by the process described with regard to views (D) through (H) of FIG. 4B above, until all of the corners have been surveyed, imaged and geo-tagged. If all of the corners have not been surveyed, then an instruction 32D may be provided for each of the corners remaining to be surveyed.

Once all of the corners have been surveyed, view (B) of FIG. 4C illustrates a graphical confirmation 32P, e.g., an annotated map or diagram 32P, of the location, periphery and area (to within the accuracy of the GPS coordinates determined by the GPS locator which can be to within about one meter). In the example illustrated, this confirmation 32P is indicated by providing "pin" symbols provided to indicate or locate each corner or the surveyed plot or field, connecting lines (preferably highlighted or otherwise made visually evident) between adjacent corners to illustrate the periphery of the plot or field, and an alphanumeric display stating the area of the plot or field as calculated from the GPS coordinates for its surveyed corners, all determined, e.g., by processing of the geo-tag data from the images taken at the corners of the plot or field.

It is noted that because the geo-tagged surveying image data for the surveying aspect 32S1 of the software app are taken looking inward toward the center of the plot, they normally capture image data relating to the condition and character of the plot or field as well as what ever may be growing (or not growing) thereon. Similarly image data is captured for the Farm Operation Images aspect 32S2 of the software app wherein the images taken and captured show the crop, its condition and progress towards harvest, which can be verified and correlated to previous similar images and the GPS coordinates as captured in any or all of the geo-tagged previous and/or related images, as well as with independent data, such as weather and rainfall data and the like, thereby enabling monitoring of the registered farmers and farm plots, and thereby reducing the likelihood that attempts to submit false or misleading information will go undetected and that incorrect, inconsistent and/or falsified information will be accepted without being questioned.

Figure 5:
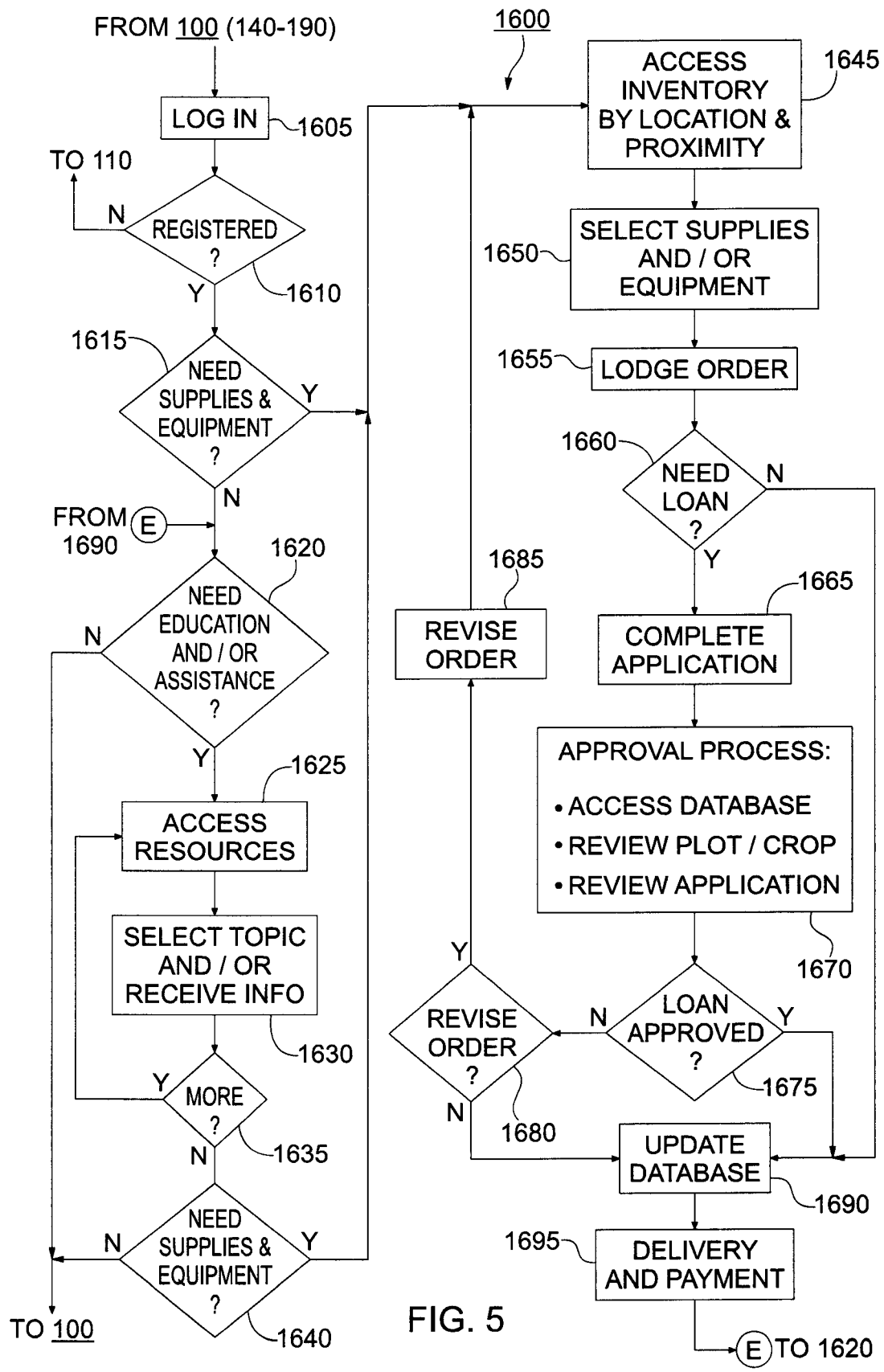
FIGS. 5 and 5A are flow chart schematic diagrams illustrating a sequence of steps of aspects of the operation of an example product exchange operation for providing financing, equipment and supplies to a producer utilizing an example electronic device.
Figure 5A:
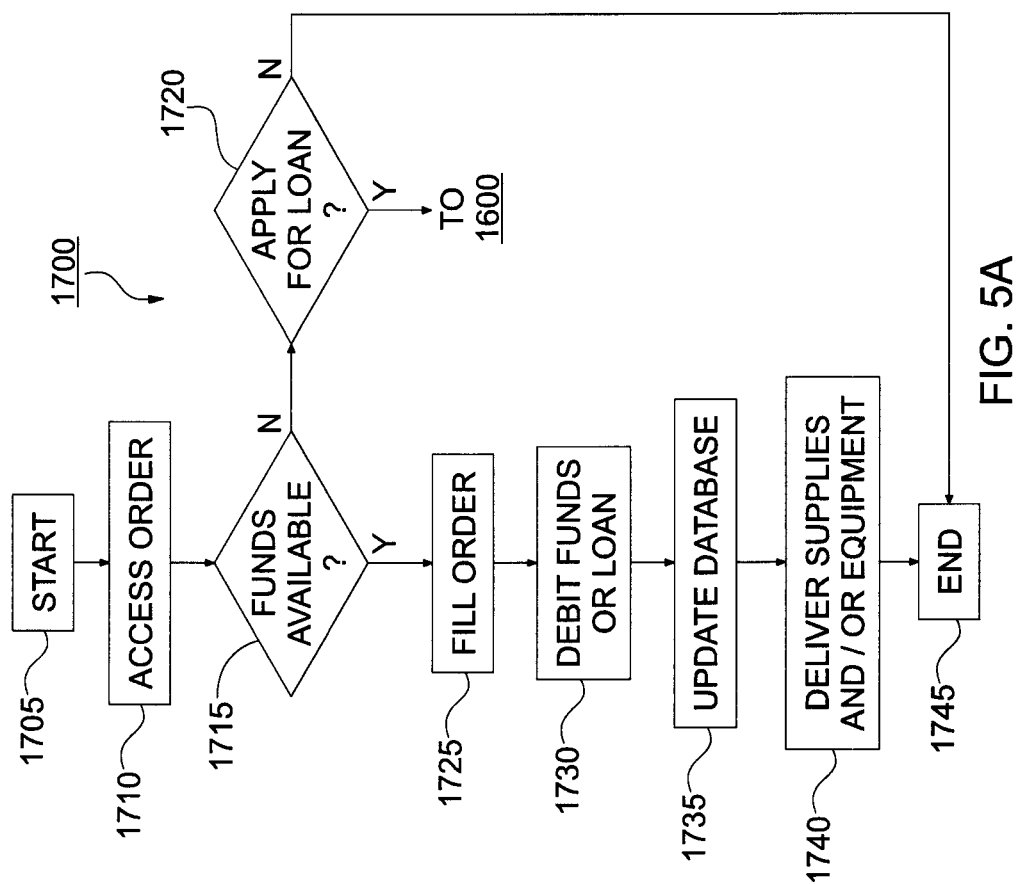

FIGS. 5 and 5A are flow chart schematic diagrams illustrating a sequence of steps of aspects 1600, 1700 of the operation 100 of an example product exchange system and method 10 for providing financing and equipment and supplies to a producer utilizing, e.g., an example electronic device 20, 30. Method or process 1600 begins as an offshoot from method or process 100, typically at a point between steps 140 and 190 thereof, e.g., after a producer has completed registering 110-130, but it may begin from any other or different step thereof, and at its conclusion returns to method or process 100. It is noted that a producer, e.g., farmer, can interact with system 10 using an electronic device 20, 30, so that process 1600 is performed as described.

Method 1600 begins with logging in 1605 for a registered (or a purportedly registered) producer, followed by verifying that the producer is registered 1610. If not, path 1610-N is followed to begin registration 110 of process 100 from where a registered participant may then re-enter process 1600. If registration is verified, path 1610-Y is follow to determine 1615 whether the participant needs supplies and/or equipment. Supplies and/or equipment is intended to encompass a wide variety of types and kinds of goods as may be related to a producer's production, e.g., for a farmer supplies and/or equipment may include seed, plant stock, fertilizer, herbicide, insecticide, rakes, hoes, shovels, stakes, posts, fencing, caging, netting, tillers, tractors, harvesters, fuel and the like, and supplies and equipment for a goods producer may include raw materials, lumber, metal stocks, nails, fasteners, hand tools, small electric tools, jigs and fixtures, packaging supplies, and the like.

If supplies and/or equipment are needed, path 1615-Y is taken to access 1645 the inventory of supplies and/or equipment that are available at various locations, e.g., starting with locations that are near to the farm plot or producer as determined from the geo-tag data associated with the registered farm plot or facility. Data relating to the supplies and equipment inventory 1645 may be and preferably is stored in a relational database including data relating to the supplies and equipment, the locations thereof, the quantities available at each location, the quantities to be available at each location and when they will be available. This database may be separate from the database described in relation to process 100 or may be the same database, as may be convenient. From the inventory 1645 the registered producer selects 1650 the supplies and/or equipment that he desires and the quantities thereof, and lodges that data as an order 1655 which is lodged or stored 1655 in the database.

Having lodged 1655 an order, the producer is queried 1660 as to payment and/or whether or not a loan is needed to pay for the ordered supplies and/or equipment. If a loan is not needed, path 1660-N is taken, the database is updated 1690, and process 1600 moves forward to delivery and payment 1695 whereat the ordered goods, supplies and/or equipment are delivered to the producer who ordered same and payment therefor is transferred from an account of the producer to that of the provider thereof or of another supplier or selling agent. Process 1600 then ends and/or returns to process 100.

If a loan is needed, then path 1660-Y is taken and a loan application is completed 1665. Preferably, the loan application can be completed using the electronic device 20, 30 and the registrant's data as previously stored in the database, and may be supplemented as necessary to verify ability to pay, credit worthiness and the like.

Approval 1670 of the loan application typically includes a number of related steps some of which may be automated, e.g., processed by a computer application, and some of which may be manual, e.g., performed by a loan officer, banking official and/or banking committee. Approval 1670 may include, e.g., accessing the database to obtain information relating to the loan applicant, e.g., a registered producer, reviewing the plot and/or crop data, e.g., from geo-tagged and time-stamped images of the plot and/or crop and updates thereof, checking a credit history, and/or reviewing the loan application, or any combination thereof, as may be necessary and desirable under the circumstances. It is noted that the loan amounts sought may be significant, e.g., as for a herd of livestock or mechanized farm equipment, or may be insubstantial, e.g., as for simple hand tools and/or small amounts of seed, and the level of scrutiny 1670 given to any particular loan application 1665 may be greater or lesser depending on the amount of the loan sought. Loans may be processed by and/or granted and funded by, e.g., private banking institutions, government banking institutions, other private entities and/or government entities, as the case may be.

If the loan is approved 1675, path 1675-Y is followed, the database is updated 1690, e.g., to include an indication of the proceeds of the loan being credited to the loan applicant. Process 1600 then moves forward to delivery and payment 1695 whereat the ordered goods, supplies and/or equipment are delivered to the producer who ordered same and payment therefor is transferred from an account of the producer to that of the provider thereof or of another supplier or selling agent. Process 1600 then ends and/or returns to process 100.

If the loan is not approved 1675, path 1675-N is followed, an opportunity is provided for the producer to revise 1680 the order. If the producer elects to not revise the order, path 1680-N is followed, the database is updated 1690 and process 1600 ends (there is no delivery or payment except to the extent the producer seeking to purchase supplies and/or equipment has sufficient funds available and/or remaining approved credit to pay for same) and/or returns to process 100. If the producer elects to revise the order, path 1680-Y is followed, the order may then be revised 1685 by returning to accessing 1645 the inventory again to prepare and submit a revised order 1645-1655.

Returning to step 1615 from which we departed above via path 1615-Y following an affirmative response to needing supplies and/or equipment, if supplies and/or equipment is not needed, path 1615-N is taken and the producer is queried 1620 as to whether education and/or assistance is desired. Education and/or assistance is intended to encompass a wide variety of formal and informal programs, information, reports, data, and the like. It can include formal instruction, e.g., as to farming techniques, soil conservation, water conservation, uses of fertilizers, herbicides, insecticides and other products, as well as regional and/or local information, e.g., crop reports, planting recommendations, precipitation and weather reports and forecasts past, present and future, and the like.

If access to education and assistance is not desired, path 1620-N is followed and process 1600 ends and/or returns to process 100. If access to education and assistance is desired, path 1620-Y is followed to provide access 1625 to the available educational and/or assistance resources, e.g., as may be stored in a relational database which may be, e.g., part of or separate from the databases referred to herein. Access 1625 affords the participant the opportunity to select 1630 the topic or topics on which education and/or assistance is desired, and to receive 1630 information relating thereto, which may include a report, registration for a course and the like, an information download, a link to a relevant web site, and/or other resources. While at least basic educational information and resources may be made available without charge to the user, the party providing the educational information and resources, e.g., a government agency, non-governmental organization (NGO) or other provider, may determine what payment, if any, will be required.

If additional (more) 1635 selections and/or information are desired, path 1635-Y is followed to again access 1625 the resources database. If not, path 1635-N is followed to a question regarding whether supplies and/or equipment is needed 1640, which is the case where the education and/or information provided leads the producer to seek 1640 supplies and/or equipment. If supplies and/or equipment is needed 1640, path 1640-Y is followed, e.g., to step 1645 to select and order same. If not, path 1640-N is taken and process 1600 ends and/or returns to process 100.

Irrespective of whether or not a particular participant elects to utilize this aspect 1600 of system and method 10 to receive education and/or information therefrom, system and method 10, 1600 provides the facility and option at the initiation of the operator thereof to provide information and/or education to participants based upon its evaluation of conditions and/or their possible need therefor. For example, where an impending weather condition, disease, blight, insect/pest infestation or other condition arises, notification and/or warning thereof can be initiated by messages, e.g., text messages and/or e-mails, sent to electronic devices 20, 30 as can education and information, e.g., protective and/or preventative steps to take, be sent. Where the condition is widespread, such notification messages can be sent to all participants or if the condition is regional or localized, messages can be sent to those likely to be affected by the regional or localized condition utilizing the location data stored in the database for that participant and his facilities. Further, one or more links can be provided to the participant of facilitate access to further relevant information and education, as well as supplies and equipment that may be helpful in the addressing the condition.

The foregoing notification and messaging feature can be augmented by locating electronic devices 20, 30 at predetermined locations that are configured to capture and report local conditions either periodically and regularly, or when conditions change by a predetermined amount. Sensors of physical conditions, e.g., of rainfall, temperature, wind and the like may be coupled to electronic devices 20, 30 that are configured to transmit date and time stamped location data and condition data, and optionally related image data, to one or more servers 50-90 where the received data can be evaluated by automated processes and/or a human operator, to initiate an appropriate response. Alternatively, participants can capture such data and transmit it in like manner to seek advice and/or information regarding the conditions they are experiencing. All of this aspect utilizes process 1600 as illustrated and described, although the initiator and/or recipient(s) may be somewhat different than expressly indicated in FIG. 5.

FIG. 5A relates to an aspect 1700 of process 100 wherein providing supplies and/or equipment to a producer is connected with the payment therefor and/or obtaining funds therefor, e.g., obtained via a loan process such as the example included in process 1600. Process or method 1700 starts 1705 from process 100 or otherwise by accessing 1710 the order previously placed by a producer and checking whether 1715 funds needed to pay for the ordered supplies and/or equipment are available 1715, e.g., by an established loan or line of credit or from an linked account at a bank or other institution. If the necessary funds are not available 1715, path 1715-N is followed to the query 1720 as to whether or not a loan is needed. If a loan is needed, path 1720-Y is taken to access the process, e.g., in process 1600, for applying for a loan. If and when a loan or other funding is obtained, e.g., via process 1600, the producer may, e.g., return to start 1705 if desired. If a loan is not needed, path 1720-N is taken because the producer has no funds or source of funds and process 1700 ends 1745 and/or returns to process 100, unless the provider thereof waives payment or will accept a lesser payment.

If, however, funds are available 1715, path 1715-Y is taken to fill 1725 the previously placed order for supplies and/or equipment. The order may be filled 1725 either in whole or in part depending upon, e.g., the producer's present need for the supplies and equipment and/or the available stock thereof at that time and place. For example, seed and fertilizer may be needed early on while insecticide and harvesting tools may not be needed until later. Based upon the extent to which the order is being filled, funds are applied (debited) 1730 from an account or a previously obtained loan and the database is updated 1735 to reflect the imminent delivery of the supplies and equipment and the payment received therefor. Then once the payment has been received, the filled order may be actually released and physically delivered 1740 to the producer and process 1700 ends 1745 and/or returns to process 100.

One potential benefit of the described system and method 10 that may be obtained is that the producers do not need to spend time and resources seeking out buyers and negotiating transactions, and so can devote more time and effort into producing their product, e.g., growing, tending and harvesting their crops. Another potential benefit that may be obtained is that buyers need not spend time and resources seeking out producers and visiting and/or inspecting their facilities, e.g., many widely scattered farming plots, and so can spend less time in finding and concluding transactions or can find and conclude more transactions with the same resources.

As a result, producers and buyers will be able to conclude more transactions, often at better prices for the producers and usually at higher quality for the buyers. Moreover, the data gathered from producers and available to buyers and financiers via the system and method described herein is seen to increase transparency, allow for auditing and for accountability both by participants as well as by the operator of system and method 10, even though the parties involved may be separated by substantial distances or other barriers.

Figure 6D:
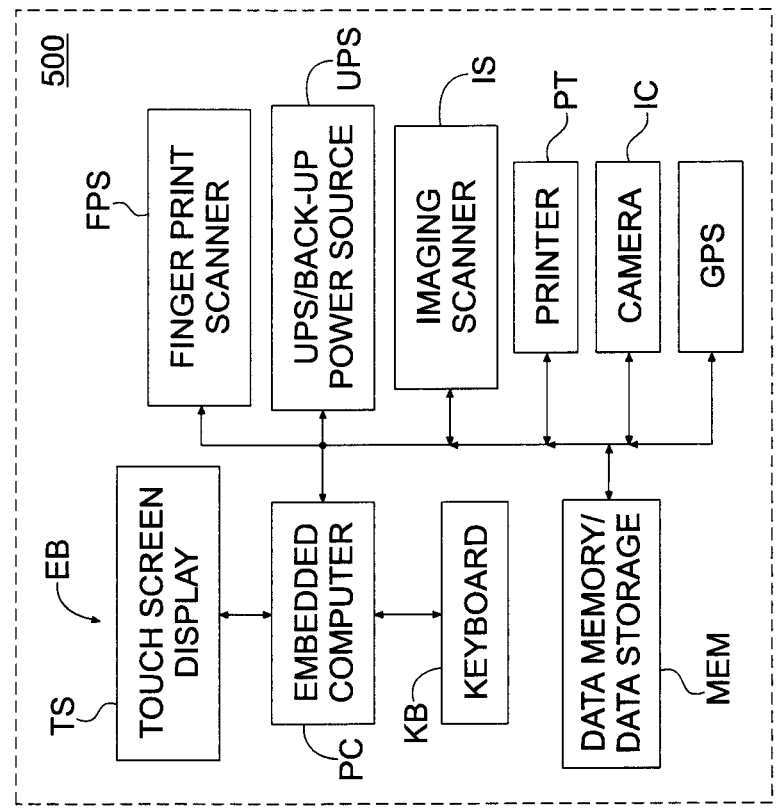
FIG. 6D is a schematic block diagram of the electronic device of FIGS. 6A-6C.
Figure 6B:
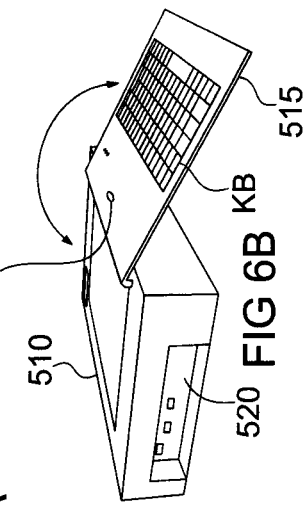
FIGS. 6A, 6B and 6C illustrate an example embodiment of an electronic device usable with to the present arrangement.
Figure 6A:
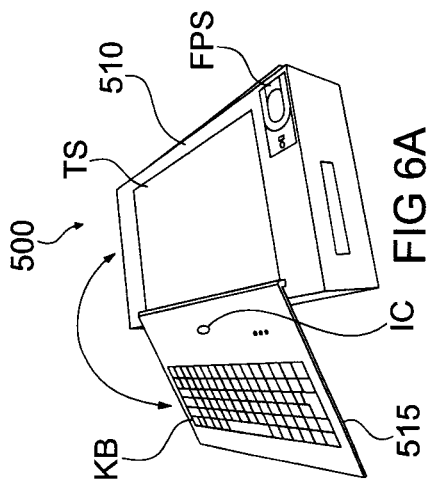
Figure 6C:
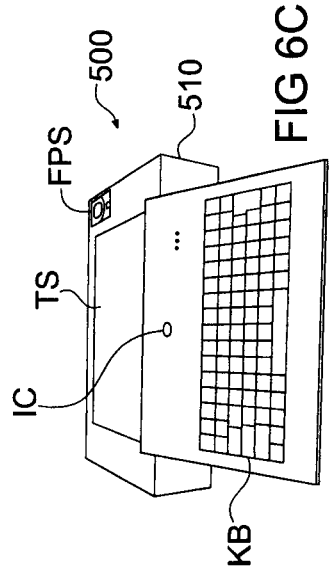

FIGS. 6A, 6B and 6C illustrate an example embodiment of an electronic device 500 usable with the present arrangement, and FIG. 6D is a schematic block diagram of the electronic device 500 of FIGS. 6A-6C. Device 500 preferably includes all of the devices necessary for it to serve as an electronic device 20 as described herein. Device 500 includes a housing 510 or physical case 510 that contains all of the devices thereof, and housing 510 may have a cover 515 that may be closed to protect touch screen TIME-STAMP and may be opened to expose touch screen TIME-STAMP. Optionally, a data entry device KB, e.g., a keyboard KB, typically a QWERTY keyboard, may be provided on cover 515 or on housing 510 such that keyboard KB is exposed when cover 515 is open. Cover 515 may be hinged or otherwise pivotably attached to housing 510 so as to be movable between open and closed positions, as indicated by the curved double-ended arrow.

Typically a personal computer PC is included in device 500 to provide the embedded processor PC as well as touch screen TIME-STAMP and keyboard KB. Typically, touch screen TIME-STAMP and keyboard KB are both used in the entry of data, e.g., as in registration, however, touch screen TIME-STAMP may be sufficient for other data entry and/or making selections, e.g., for displaying and selecting from a drop down menu or display window. Computer PC may be an actual personal computer, laptop computer, or tablet computer, or may be a PC motherboard, one or more microprocessors or other digital processors. Device 500 also includes one or more data storage devices and/or memories MEM for storing registration data, biometric data, entered data and other data, and some or part of memory MEM may be provided and/or part of computer PC. Preferably data memory and storage MEM includes data storage devices of different types and kinds, e.g., a hard drive (magnetic), semiconductor memory (e.g., RAM, DRAM), an optical drive (e.g., for CD and/or DVD media).

A fingerprint scanner FPS and/or an imaging camera IC may be provided in housing 510 for capturing biometric data, e.g., fingerprint data and/or facial image data, or a representation thereof, e.g., as a unique identifier generated from such biometric data. Fingerprint scanner FPS has an exposed touch sensitive surface upon which fingers may be placed for capturing fingerprint data. Imaging camera IC, preferably has an exposed lens for capturing facial image data and/or images of a business and/or product, e.g., a farm and/or crop, or a representation thereof, and the lens may be in a fixed position or may be adjustable for capturing images for persons and scenes in different positions relative to device 500. Fingerprint scanner FPS and/or imaging camera IC may be employed for capturing biometric data for registration and/or for verifying identity in conducting other aspects of a product exchange transaction. Image camera IC may be provided as part of an optional accessory kit for device 500 and may include a pan, tilt, zoom and/or focus unit whereby the camera direction may be controlled, e.g., either manually or automatically via the downloaded software app or other imaging software.

An electrical interface 520 is provided on housing 510, e.g., on a rear or side surface thereof, for connecting device 500 to one or more external devices, and interface 520 may have an openable cover for protecting interface 520 and/or limiting access to interface 520 to persons authorized such access, e.g., election workers and officials. The cover may be lockable with a key lock for security, or may have an electrical lock that is releasable responsive to entry of key data via touch screens TIME-STAMP and/or keyboard KB. Interface 520 may include various data, signal and/or electrical power ports or connections, as described below.

Housing 510 also preferably includes a source of electrical power for operating device 500. Typically the source of electrical power includes a power supply operable from available external electrical power, e.g., local 110 volt-220 volt AC power mains, and preferably a battery or other source of backup power in the event external electrical power is not available or is interrupted, thereby providing a so-called uninterruptible power source UPS. Optionally, an external charging device may also be provided, e.g., a solar power source.

Optionally, a printer PT may be provided for printing documents produced at device 500, e.g., a registration receipt, a registration card, an instruction document, a reminder or "things to do" checklist and/or another document. Also optionally, an imaging scanner IS may be provided where device 500 is to be utilized as a scanner for receiving physical documents and generating electronic files representative thereof, e.g., in an Adobe Acrobat (.pdf) format, an MS Word (.doc) format, an image (jpg) format or another format.

A location determining device GPS, e.g., a Global Positioning System (GPS) device or other suitably accurate locating device, may be included in device 500 so that the location thereof may be correlated with specific operations performed thereby, in particular images defining of a production facility such as a farm plot, e.g., by its corners, and subsequent images relating thereto. The location of the device 500 at any given time may be, e.g., stored in the relevant database record and/or in an events log, and may be correlated with the specific operations performed, e.g., the registrations made thereby, the addresses entered for registrants, the status of production reported thereby and the like, whereby events and operations may be geo-tagged. In addition, geo-tagged data can enable the specific operations and/or data entered to be geographically overlaid onto a map, e.g., by a Geographic Information System (GIS) application or other software application, using GPS, geo-tagging and/or other location data. The GIS software, if any, may be resident on server 40 or may be on a regional and/or central server or another computer, e.g., a server associated with a monitoring and/or management operation.

Optionally, a privacy screen may be provided for attaching to housing 510 for shielding touch screen TIME-STAMP from the view of people other than the person using device 500 thereby to increase privacy, and/or a protective case may be provided for transportation, security and storage of device 500.

It is noted that device 500 is only one specific example of an electronic device 20, 30 that may be employed in conjunction with the system and method 10 described herein. Electronic device 500 may be suited for equipping representatives, e.g., of government, NGOs and the like, who go out into the field to seek producers who can be registered to participate in product exchange system and method 500. All of the necessary features and functions provided by electronic device 500 may also be realized using a smart phone or tablet computer or similar electronic device 20, 30 that is configured by a downloaded software application as described.

FIG. 7 illustrates an example embodiment of an electronic device 700 usable with the present arrangement. Device 700, similarly to device 500, preferably includes all of the devices necessary for it to serve as a registration device as described herein as well as to serve as an electronic device 20. Device 700 includes a housing 710 or physical case 710 that contains all of the devices thereof. A portable computer PC is provided in a position wherein its monitor may be rotated upward into position (shown in dashed line) where it provides access to touch screen TIME-STAMP that serves as a display and as a data entry device KB. Typically, a keyboard KB, e.g., a QWERTY keyboard, of computer PC is exposed when its monitor display TIME-STAMP is rotated to an open position. Housing 710 includes members that surround and retain the base portion of computer PC therein and, at least when a removable and preferably lockable cover thereof is closed, blocks access to the various USB and other data ports of computer PC. Housing 710 may optionally include a closable storage compartment for receiving various accessories usable with device 700, e.g., an external charger, USB and other cables, extra printer ink cartridges, and the like.

A fingerprint scanner FPS and/or an imaging camera IC may be provided in housing 710 for capturing biometric data, e.g., fingerprint data and/or facial image data, or a representation thereof, similarly to device 500 as described above. Housing 710 also includes a source of electrical power and/or an external charging device for operating device 700, similarly to device 500 as described above. A printer PT and/or optionally a scanning device IS may be provided, similarly to device 500 as described above. In the illustrated embodiment, printer PT is secured near a corner of housing 710 where blank paper may be easily fed and printed documents may easily be provided, and where field servicing, e.g., replacement of ink cartridges, may easily be accomplished.

A location determining device GPS, e.g., a Global Positioning System (GPS) device or other locating device, may be included in device 700, similarly to device 500 as described above. Also optionally, a privacy screen and/or a protective case may be provided, similarly to device 500 as described above.

An electrical interface 720 is provided on housing 710, e.g., on a rear or side surface thereof, for connecting device 700 to one or more external devices, and may have an openable cover, similarly to device 500 described above. Housing 710 may also have a storage compartment 712 for storing accessories, e.g., an ink cartridge, cables and the like.

An optional case 740 is provided for the storage and/or transport of electronic device 700. Case 740 typically includes a base portion having one or more carrying handles and a padded recess shaped to receive and cushion device 700 therein, and a hinged cover portion that can be closed over device 700 to retain it securely in case 740. The joint between cover and base portions may be provided with a gasket to seal against entry of contaminants, e.g., moisture, dirt, debris and the like, when the clasps and/or latches of case 740 are secured.

Device 700 may further include an optional solar powered portable charging device 750 which provides at least sufficient electrical power via power cable 756 to recharge the internal battery of device 700 within a reasonable time, and preferably provides sufficient electrical power when properly positioned in bright sunlight to operate device 700. In the example embodiment illustrated, eight solar cell panels 752 can typically provide up to about 80 watts of power (a typical unit requires about 40 watts when operating) and can typically recharge the battery of device 700 in about 8-24 hours.

Solar charging device 750 preferably includes a foldable substrate 754 on which are disposed a plurality of solar cell panels 752. Substrate 754 supports and provides electrical connections between panels 752 and folds to provide a protective case and cover for solar panels 752, and may have hook and loop 758 or another fastener 758 for securing the folded solar charging device in a folded up configuration. Electrical charging cable 756 has a connector at the remote end thereof that plugs into a charging connector of interface 720 on housing 710. In the example illustrated, solar powered charger 750 is about 12-18 inches by 18-24 inches (about 30.5-45.7 cm by 45.7-61 cm) when deployed and about one-quarter that size when folded up for storage and/or transport.

It is noted that device 700 is only one specific example of an electronic device 20, 30 that may be employed in conjunction with the system and method 10 described herein. Electronic device 00 may be suited for equipping representatives, e.g., of government, NGOs and the like, who go out into the field to seek producers who can be registered to participate in product exchange system and method 500. All of the necessary features and functions provided by electronic device 700 are also realized using a smart phone or tablet computer or similar electronic device 20, 30 that is configured by a downloaded software application as described.

A method 100, 1500, 1600, 1700 for a product exchange usable by plural producers may comprise: configuring 105 an electronic device 20, 30 having a device identifier and including an imaging device for capturing image data, including a data entry device selected from the group including a touch screen, a keyboard, and a combination thereof, including a communication device selected from the group including wireless communication, Bluetooth communication, WiFi communication, cellular communication, satellite telephony communication, and a combination thereof, and including a geographic position locator for determining geographic location, the configuring 105 including configuring the electronic device 20, 30 for geo-tagging captured image data using the determined geographic location and for time stamping the geo-tagged captured image data with date and/or time data; receiving 110-130 registration data from a producer using the electronic device 20, 30, wherein the registration data is geo-tagged and time stamped and associated with the identifier of the electronic device 20, 30; receiving 150-165 facility data defining a facility and product data defining a product of the facility using the electronic device 20, 30, wherein the facility data includes one or more geo-tagged and time-stamped images of the facility and the product data includes one or more geo-tagged and time-stamped images that identifies the product, wherein the facility data and the product data are associated with the identifier of the electronic device 20, 30; storing 140, 170 the registration data, the facility data and the identifier of the electronic device 20, 30 associated therewith in a relational database that is separate from the electronic device 20, 30; whereby the producer and the producer facility are registered and the product is associated therewith in the relational database; repeating the foregoing steps 105-170 for registering a plurality of producers; receiving 205-215 registration data from a buyer and associating the buyer registration data with a unique buyer identifier; receiving 210, 225-230 qualifying data from the buyer and associating the buyer qualifying data with the unique buyer identifier, wherein the buyer qualifying data includes funds data relating to funds available as payment for any product delivered; storing 220, 235 the buyer registration data, the buyer qualifying data and the unique buyer identifier associated therewith in the relational database, whereby the buyer is registered and qualified; receiving 240-250 a product query for a certain product from the qualified buyer; generating 250 a response to the product query from the product data stored in the relational database relating to the certain product and communicating the response to the qualified buyer, wherein the generated response includes product data from the relational database relating to the certain product; receiving 255-265 from the qualified buyer one or more offers relating to the product data relating to the certain product and storing the one or more offers in the relational database; communicating 270 the received one or more offers to one or more registered producers of the certain products to which the one or more offers relate; receiving 300-305 from the one or more producers an acceptance or a rejection of the one or more communicated offers and storing 275-280, 305 the acceptance or rejection in the relational database; receiving 175-185 from the one or more producers and/or from the buyer an agreed quantity and delivery date for the certain products covered by the accepted offers and storing 305 the agreed quantity and delivery date in the relational database; after an offer is accepted 285, 300, receiving 175-180 from the one or more producers updated facility data and updated product data using the electronic device 20, 30 and storing 185 the updated facility data and the updated product data in the relational database, wherein the updated facility data and the updated product data include one or more geo-tagged and time-stamped images of the facility and of the product, wherein the updated facility data and the updated product data are associated with the identifier of the electronic device 20, 30; when product is delivered 350-365, receiving 350-360 product delivery data from the producer, from the buyer, and/or from a delivery agent, and storing 360 the product delivery data in the relational database; and initiating transfer of payment 365-370 from the buyer of the delivered product to the producer of the delivered product from buyer funds represented by the funds data as available as payment for the product delivered. Receiving 150, 1500 facility data defining a facility may comprise: receiving 1504 a first geo-tagged image of the facility taken at a first corner on a periphery thereof; receiving 1506*a* second geo-tagged image of the facility taken at a second corner along the periphery thereof; receiving 1506 one or more additional geo-tagged images of the facility taken at one or more additional corners along the periphery thereof until 1508 geo-tagged images taken at all of the corners along the periphery of the facility are received; storing 1510 the received geo-tagged images of the facility in the relational database. The method 100, 1500, 1600, 1700 may further include: processing 1515-1520 location data associated with each of the geo-tagged images of the facility to determine the length of the periphery thereof; or processing 1515-1520 location data associated with each of the geo-tagged images of the facility to determine the area thereof; or processing 1515-1520 location data associated with each of the geo-tagged images of the facility to determine a geographic location thereof; or processing 1515-1520 location data associated with each of the geo-tagged images of the facility to determine the length of the periphery and the area thereof; or processing 1515-1520 location data associated with each of the geo-tagged images of the facility to determine the length of the periphery and the geographic location thereof; or processing 1515-1520 location data associated with each of the geo-tagged images of the facility to determine the area and the geographic location thereof; or processing 1515-1520 location data associated with each of the geo-tagged images of the facility to determine the length of the periphery, the area and the geographic location thereof. The method 100, 1500, 1600, 1700 may further include: storing 195, 1510, 1526 the determined length of the periphery, the area and/or the geographic location in the relational database; or communicating 250, 1530-1532 the determined length of the periphery, the area and/or the geographic location to the electronic device 20, 30 from which the images taken at the corners of the periphery of the facility were taken; or storing 195, 1510, 1526 the determined length of the periphery, the area and/or the geographic location in the relational database and communicating 250, 1530-1532 the determined length of the periphery, the area and/or the geographic location to the electronic device 20, 30 from which the images taken at the corners of the periphery of the facility were taken. The method 100, 1500, 1600, 1700 may further include: receiving 1615, 1640-1645 a request for a supply or for an equipment or for an educational material or for a combination thereof, wherein the request originated from an electronic device 20, 30 and may comprise location data of that electronic device 20, 30; providing 1645-1650 a response representing available supplies or available equipment or available educational materials or a combination thereof, at one or more locations proximate the geographic location of the electronic device 20, 30 represented by the location data thereof; receiving and accepting 1650-1655 an order for an available supply or for available equipment or for available educational materials or for a combination thereof represented in the response; and delivering 1740 the ordered available supply or ordered available equipment or ordered available educational materials or an ordered combination thereof at the one or more locations proximate the geographic location of the electronic device 20, 30. The method 100, 1500, 1600, 1700 may further include prior to the delivering the order: filling 1715 the order; and debiting 1730 funds in payment for the order and authorizing delivery thereof. The method 100, 1500, 1600, 1700 may further include: receiving 1615, 1640-1645 a request for a supply or for an equipment or for an educational material or for a combination thereof, wherein the request originates from an electronic device 20, 30 and may comprise location data of that electronic device 20, 30; providing 1645-1650 a response representing available supplies or available equipment or available educational materials or a combination thereof, at one or more locations proximate the geographic location of the electronic device 20, 30 represented by the location data thereof; receiving 1650-1655 an order for an available supply or for available equipment or for available educational materials or for a combination thereof represented in the response; receiving 1665 an application for a loan to pay for the ordered available supply or ordered available equipment or ordered available educational materials or an ordered combination thereof; evaluating 1665-1670 the application for a loan and when the loan is approved, then: accepting 1710-1725 the order for the available supply or for the available equipment or for the available educational materials or for the combination thereof represented in the response; and delivering 1740 the available supply or the available equipment or the available educational materials or the combination thereof represented by the accepted order. The method 100, 1500, 1600, 1700 may further include prior to the delivering the order: filling 1725 the order; or debiting funds 1730 from the approved loan in payment for the order and authorizing delivery of the order; or filling 1725 the order and debiting funds 1730 from the approved loan in payment for the order and authorizing delivery of the order. The method 100, 1500, 1600, 1700 may further comprise: comparing 1528-1530 the one or more geo-tagged and time-stamped images of the product data stored in the relational data base and the one or more geo-tagged and time-stamped images of the updated product data from the relational database to determine the quantity of the product, or the quality of the product, or the quantity and quality of the product. Comparing 1528-1530 the one or more geo-tagged and time-stamped images of the product data stored in the relational data base and the one or more geo-tagged and time-stamped images of the updated product data from the relational database may comprise: comparing 1528-1530 location data from the geo-tags thereof and when the location data from the geo-tags thereof is consistent with a particular facility, providing an indication thereof; or comparing 1528-1530 time and/or date data from the time stamps thereof and when the time and/or date data is consistent with a period of time between when the facility was registered and a current time, providing an indication thereof; or comparing 1528-1530 location data from the geo-tags thereof and comparing time and/or date data from the time stamps thereof, and when the location data from the geo-tags thereof is consistent with a particular facility and when the time and/or date data is consistent with a period of time between when the facility was registered and a current time, providing an indication thereof. Comparing 1528-1530 the one or more geo-tagged and time-stamped images of the product included in the product data stored in the relational data base and the one or more geo-tagged and time-stamped images of the product included in the updated product data from the relational database may comprise: comparing 1528-1530 image data from the one or more geo-tagged and time-stamped images of the product to determine one or more physical attributes of the product represented therein; and then: determining 1528-1530 from differences in the one or more physical attributes of the product represented therein a quantity of the product represented therein; or determining 1528-1530 from differences in the one or more physical attributes of the product represented therein a quality of the product represented therein; or determining 1528-1530 from differences in the one or more physical attributes of the product represented therein a quantity and a quality of the product represented therein. Electronic device 20, 30 may comprise a smart phone, a tablet computer, a portable computer or another electronic computing device; or configuring 105 the electronic device 20, 30 may comprise communicating 105 a software application to the electronic device 20, 30 and running 105 the software application thereon; or electronic device 20, 30 may comprise a smart phone, a tablet computer, a portable computer or another electronic computing device and configuring 105 the electronic device 20, 30 may comprise communicating 105 a software application to the electronic device 20, 30 and running 105 the software application thereon. The facility 32P, 32PO represented by the facility data may comprise a field, a plot of land, a farm, a pasture, a pond, a pool, a lake, a range, a quarry, a room, a shop, a work area, a manufacturing facility, an assembly facility, a repair facility, a maintenance facility, a factory, or any combination thereof. The product represented by the product data may comprise: a fruit, a vegetable, a plant, a bush, a tree, a crop, an animal, a herd, livestock, a bird, a fowl, a fish, a water creature, sand, rock, gravel, crushed stone, a part, an assembly, a handicraft, a garment, cloth, clothes, wearing apparel, a mechanical device, an electrical device, an electronic device 20, 30, or any combination thereof.

A method 100, 1500, 1600, 1700 for a product exchange usable by plural producers may comprise: configuring 105 an electronic device 20, 30 having a device identifier and including an imaging device for capturing image data, including a data entry device selected from the group including a touch screen, a keyboard, and a combination thereof, including a communication device selected from the group including wireless communication, Bluetooth communication, WiFi communication, cellular communication, satellite telephony communication, and a combination thereof, and including a geographic position locator for determining geographic location, the configuring 105 including configuring the electronic device 20, 30 for geo-tagging captured image data using the determined geographic location and for time stamping the geo-tagged captured image data with date and/or time data; receiving 110-130 registration data from a producer using the electronic device 20, 30, wherein the registration data is geo-tagged and time stamped and associated with the identifier of the electronic device 20, 30; receiving 150-165 facility data defining a facility and product data defining a product of the facility using the electronic device 20, 30, wherein the facility data includes one or more geo-tagged and time-stamped images of the facility and the product data includes one or more geo-tagged and time-stamped images that identifies the product, wherein the facility data and the product data are associated with the identifier of the electronic device 20, 30; storing 140, 170 the registration data, the facility data and the identifier of the electronic device 20, 30 associated therewith in a relational database that is separate from the electronic device 20, 30; whereby the producer and the producer facility are registered and the product is associated therewith in the relational database; repeating the foregoing steps 105-170 for registering a plurality of producers; receiving 1615, 1640-1645 a request for a supply or for an equipment or for an educational material or for a combination thereof, wherein the request originated from a configured electronic device 20, 30 of a registered producer and includes location data of that electronic device 20, 30; providing 1645-1650 a response representing available supplies or available equipment or available educational materials or a combination thereof, at one or more locations proximate the geographic location of the electronic device 20, 30 of the registered producer represented by the location data thereof; receiving 1650-1655 an order for an available supply or for available equipment or for available educational materials or for a combination thereof represented in the response; and then either: accepting 1650-1655 the order for the available supply or the available equipment or the available educational materials or a combination thereof represented in the response; or receiving 1665 an application for a loan to pay for the ordered available supply or the ordered available equipment or the ordered available educational materials or the ordered combination thereof, and evaluating 1665-1670 the application for a loan for approving the loan. The method 100, 1500, 1600, 1700 may further comprise: when the order is accepted 1650-1655, then: delivering 1740 the ordered available supply or ordered available equipment or ordered available educational materials or an ordered combination thereof at the one or more locations proximate the geographic location of the electronic device 20, 30. The method 100, 1500, 1600, 1700 may further include prior to the delivering the order: filling 1715 the order; and debiting funds 1730 in payment for the order and authorizing delivery thereof. The method 100, 1500, 1600, 1700 may further comprise: when the loan is approved 1665-1670, then: accepting 1710-1725 the order for the available supply or for the available equipment or for the available educational materials or for the combination thereof represented in the response; and delivering 1740 the available supply or the available equipment or the available educational materials or the combination thereof represented by the accepted order. The method 100, 1500, 1600, 1700 may further include prior to the delivering the order: filling 1725 the order; or debiting funds 1730 from the approved loan in payment for the order and authorizing delivery of the order; or filling 1725 the order and debiting funds 1730 from the approved loan in payment for the order and authorizing delivery of the order. The method 100, 1500, 1600, 1700 may further comprise: receiving 205-215 registration data from a buyer and associating the buyer registration data with a unique buyer identifier; receiving 210, 225-230 qualifying data from the buyer and associating the buyer qualifying data with the unique buyer identifier, wherein the buyer qualifying data may comprise funds data relating to funds available as payment for any product delivered; storing 220, 235 the buyer registration data, the buyer qualifying data and the unique buyer identifier associated therewith in the relational database, whereby the buyer is registered and qualified; receiving 240-250 a product query for a certain product from the qualified buyer; generating 250 a response to the product query from the product data stored in the relational database relating to the certain product and communicating 270 the response to the qualified buyer, wherein the generated response may comprise product data from the relational database relating to the certain product; receiving 255-265 from the qualified buyer one or more offers relating to the product data relating to the certain product and storing the one or more offers in the relational database; communicating 270 the received one or more offers to one or more registered producers of the certain products to which the one or more offers relate; receiving 300-305 from the one or more producers an acceptance or a rejection of the one or more communicated offers and storing 275-280, 305 the acceptance or rejection in the relational database; receiving 175-185 from the one or more producers and/or from the buyer an agreed quantity and delivery date for the certain products covered by the accepted offers and storing the agreed quantity and delivery date in the relational database; after an offer is accepted 285-300, receiving 175-180 from the one or more producers updated facility data and updated product data using the electronic device 20, 30 and storing 185 the updated facility data and the updated product data in the relational database, wherein the updated facility data and the updated product data include one or more geo-tagged and time-stamped images of the facility and of the product, wherein the updated facility data and the updated product data are associated with the identifier of the electronic device 20, 30; when product is delivered 350-365, receiving 350-360 product delivery data from the producer, from the buyer, and/or from a delivery agent, and storing 360 the product delivery data in the relational database; and initiating transfer of payment 365-370 from the buyer of the delivered product to the producer of the delivered product from buyer funds represented by the funds data as available as payment for the product delivered. The receiving facility data defining a facility 32P, 32PO may comprise: receiving 1504 a first geo-tagged image of the facility taken at a first corner on a periphery thereof; receiving 1506 a second geo-tagged image of the facility taken at a second corner along the periphery thereof; receiving 1508 one or more additional geo-tagged images of the facility taken at one or more additional corners along the periphery thereof until 1508 geo-tagged images taken at all of the corners along the periphery of the facility are received; storing 1510 the received geo-tagged images of the facility in the relational database. The method 100, 1500, 1600, 1700 may further include: processing 1515-1520 location data associated with each of the geo-tagged images of the facility to determine the length of the periphery thereof; or processing 1515-1520 location data associated with each of the geo-tagged images of the facility to determine the area thereof; or processing 1515-1520 location data associated with each of the geo-tagged images of the facility to determine a geographic location thereof; or processing 1515-1520 location data associated with each of the geo-tagged images of the facility to determine the length of the periphery and the area thereof; or processing 1515-1520 location data associated with each of the geo-tagged images of the facility to determine the length of the periphery and the geographic location thereof; or processing 1515-1520 location data associated with each of the geo-tagged images of the facility to determine the area and the geographic location thereof; or processing 1515-1520 location data associated with each of the geo-tagged images of the facility to determine the length of the periphery, the area and the geographic location thereof. The method 100, 1500, 1600, 1700 may further include: storing 195, 1510, 1526 the determined length of the periphery, the area and/or the geographic location in the relational database; or communicating 250, 1530-1532 the determined length of the periphery, the area and/or the geographic location to the electronic device 20, 30 from which the images taken at the corners of the periphery of the facility were taken; or storing 195, 1510, 1526 the determined length of the periphery, the area and/or the geographic location in the relational database and communicating 250, 1530-1532 the determined length of the periphery, the area and/or the geographic location to the electronic device 20, 30 from which the images taken at the corners of the periphery of the facility were taken. The method 100, 1500, 1600, 1700 may further comprise: comparing 1528-1530 the one or more geo-tagged and time-stamped images of the product data stored in the relational data base and the one or more geo-tagged and time-stamped images of the updated product data from the relational database to determine the quantity of the product, or the quality of the product, or the quantity and quality of the product. The comparing 1528-1530 he one or more geo-tagged and time-stamped images of the product data stored in the relational data base and the one or more geo-tagged and time-stamped images of the updated product data from the relational database may comprise: comparing 1528-1530 location data from the geo-tags thereof and when the location data from the geo-tags thereof is consistent with a particular facility, providing an indication thereof; or comparing 1528-1530 time and/or date data from the time stamps thereof and when the time and/or date data is consistent with a period of time between when the facility was registered and a current time, providing an indication thereof; or comparing 1528-1530 location data from the geo-tags thereof and comparing time and/or date data from the time stamps thereof, and when the location data from the geo-tags thereof is consistent with a particular facility and when the time and/or date data is consistent with a period of time between when the facility was registered and a current time, providing an indication thereof. The comparing 1528-1530 the one or more geo-tagged and time-stamped images of the product included in the product data stored in the relational data base and the one or more geo-tagged and time-stamped images of the product included in the updated product data from the relational database may comprise: comparing 1528-1530 image data from the one or more geo-tagged and time-stamped images of the product to determine one or more physical attributes of the product represented therein; and then: determining 1528-1530 from differences in the one or more physical attributes of the product represented therein a quantity of the product represented therein; or determining 1528-1530 from differences in the one or more physical attributes of the product represented therein a quality of the product represented therein; or determining 1528-1530 from differences in the one or more physical attributes of the product represented therein a quantity and a quality of the product represented therein. Electronic device 20, 30 may comprise a smart phone, a tablet computer, a portable computer or another electronic computing device; or configuring 105 the electronic device 20, 30 may comprise communicating 105 a software application to the electronic device 20, 30 and running 105 the software application thereon; or electronic device 20, 30 may comprise a smart phone, a tablet computer, a portable computer or another electronic computing device and configuring 105 the electronic device 20, 30 may comprise communicating 105 a software application to the electronic device 20, 30 and running 105 the software application thereon. The facility 32P, 32PO represented by the facility data may comprise: a field, a plot of land, a farm, a pasture, a pond, a pool, a lake, a range, a quarry, a room, a shop, a work area, a manufacturing facility, an assembly facility, a repair facility, a maintenance facility, a factory, or any combination thereof. The product represented by the product data may comprise: a fruit, a vegetable, a plant, a bush, a tree, a crop, an animal, a herd, livestock, a bird, a fowl, a fish, a water creature, sand, rock, gravel, crushed stone, a part, an assembly, a handicraft, a garment, cloth, clothes, wearing apparel, a mechanical device, an electrical device, an electronic device 20, 30, or any combination thereof.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Although terms such as "front," "back," "rear," "side," "end," "top," "bottom," "up," "down," "left," "right," "upward," "downward," "forward," "backward," "rearward," "under" and/or "over," "vertical," "horizontal," and the like, may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

As used herein, the term "and/or" encompasses both the conjunctive and the disjunctive cases, so that a phrase in the form "A and/or B" encompasses "A" or "B" or "A and B." In addition, the term "at least one of" one or more elements is intended to include one of any one of the elements, more than one of any of the elements, and two or more of the elements up to and including all of the elements, and so, e.g., the phrase in the form "at least one of A, B and C" includes "A," "B," "C," "A and B," "A and C," "B and C," and "A and B and C."

While various operations, steps and/or elements of a process or method or operation may be described in an order or sequence, the operations, steps and/or elements do not need to be performed in that order or sequence, or in any particular order or sequence, unless expressly stated to require a particular order or sequence.

It is noted that while the device identifiers and/or unique identifiers and/or other identifiers may be referred to as "numbers," each may include numerical, alphabetic, alphanumeric and other characters and symbols, conventional or arbitrary, as may be desired. Information is typically represented and/or stored in a memory in accordance with a predetermined formula or algorithm or other scheme, either on a character by character basis or on the basis of one or more combinations of the characters or values, for example, binary, binary coded decimal, hexadecimal, or any other digital coding representation thereof. A parity or check number or code, if any, may likewise be representative of the information represented or stored in the memory in accordance with a predetermined formula or algorithm or other scheme, either on a character by character basis or on the basis of one or more combinations of the characters or values stored in the memory. Suitable formula and algorithms therefor may include, for example, binary, binary coded decimal, other digital coding representations thereof, parity checks or other parity representations, sum checks, field relationship checks or any other predetermined relationship between the stored data or information and the parity or check number or code. It is also noted that unique identifiers generated from biometric data may be referred to as a biometric identifier or as a biometric verification number.

The present arrangement can be and preferably is at least in part embodied as a computer implemented process or processes and/or apparatus for performing such computer-implemented process or processes, and can also be embodied in the form of a tangible medium containing a non-transitory computer program or other machine-readable instructions (herein "computer program"), wherein when the computer program is loaded into a computer or other processor (herein "computer") and/or is executed by the computer, the computer becomes an apparatus for practicing the process or processes. Storage media for containing such computer program include, for example, floppy disks and diskettes, compact disk (CD)-ROMs (whether or not writeable), DVD digital disks, RAM and ROM memories, computer hard drives and back-up drives, external hard drives, "thumb" drives, and any other non-transitory storage medium readable by a computer. The process or processes can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes a non-transitory apparatus for practicing the process or processes. The process or processes may be implemented on a general purpose microprocessor or on a digital processor specifically configured to practice the process or processes. When a general-purpose microprocessor is employed, the computer program code configures the circuitry of the microprocessor to create specific logic circuit arrangements. Storage medium readable by a computer includes medium being readable by a computer per se or by another machine that reads the computer instructions for providing those instructions to a computer for controlling its operation. Such machines may include, for example, a punched card reader, a magnetic tape reader, a magnetic card reader, a memory card reader, an optical scanner, an imager, as well as machines for reading the storage media mentioned above.

It is noted that various data and values may represent actual physical conditions of different places and/or different equipment and/or different parts of an installation, farm, article, and/or other place, e.g., generally local conditions, that may be transformed by the system and method described herein to provide a representation of the overall state and/or condition of the installation, farm, article, and/or place, e.g. a representation of the complete installation, farm, article and/or place. That representation may be transformative of a representation of a nominal overall state and/or condition thereof, e.g., in a prior or different condition and/or time, to a representation of an actual overall state and/or condition thereof, e.g., in a present or more recent or otherwise different condition and/or time. Further, the system and method may generate tasks and commands that are executed to transform the installation, farm, article and/or place into a different configuration, i.e. into a different installation, farm, article and/or place, and a representation of that different configuration is provided or displayed, e.g., to human operators. The system described herein may include one or more general purpose and/or special purpose computers, or microprocessors or other processors, and the method described herein may be performed in part by one or more general purpose and/or special purpose computers, or microprocessors or other processors.

As used herein, image and/or information and/or data are used interchangeably with respect to what is captured by an imaging device and/or is displayed on a display device, and are intended to encompass any and all of the wide variety of devices that a user may desire, including, but not limited to, visual images and pictures, whether still or moving, whether captured and/or generated by a camera, computer or any other source, whether true, representative or abstract or arbitrary, whether or not including symbols or characters such as alphanumeric characters or mathematical notations, whether captured and/or displayed in black and white, monochrome, polychrome or full color.

While the present invention has been described in terms of the foregoing example embodiments, variations within the scope and spirit of the present invention as defined by the claims following will be apparent to those skilled in the art. For example, the electronic device 20, 30 described to interface with system and method 10 may be, and most often will be, a smart phone or tablet device of a user of the system and method 10, third party electronic devices and/or other devices may be provided and/or specifically configured, e.g., by employing a software app or by embedded software and or memory devices.

While the system and method 10 is described as being used by plural users, e.g., producers and buyers, the numbers of producers and buyers will be determined by usage and is not subject to a theoretical limit, however, the number of either or both producers and buyers may be limited as a practical matter by the capacity of the servers, memories and computer processors that are provided in any given embodiment of a product exchange system 10.

The facility represented by the facility data may include a field, a plot of land, a farm, a pasture, a pond, a pool, a lake, a range, a quarry, a room, a shop, a work area, a manufacturing facility, an assembly facility, a repair facility, a maintenance facility, a factory, or any other place where a product is grown or made, and any combination thereof.

The product represented by the product data may include a fruit, a vegetable, a plant, a bush, a tree, a crop, an animal, a herd, livestock, a bird, a fowl, a fish, a water creature, sand, rock, gravel, crushed stone, a part, an assembly, a handicraft, a garment, cloth, clothes, wearing apparel, a mechanical device, an electrical device, an electronic device, or any other product or any combination thereof.

The smart phone as used herein includes any cellular telephone or communicating data device that is capable of being configured to operate in conjunction with the system and method 10 described herein, whether or not the provider and/or user of such device considers it to be a smart phone.

Further, any smart phone 30 or other electronic device 30 may be shared by producers, e.g., farmers located near to each other, with the unique device identifier being supplemented by the producers registration data, e.g., name, user name, password, biometric identifier and/or other distinguishing data. The downloadable mobile application that configures the electronic device preferably provides suitable log-in and security features to enable use of any electronic device 30 by plural users while maintaining individual distinguishing data between such sharing users of any given device. It is noted that the log-in and security features provided by the application configuring electronic device 30 may also be configured to enable a given producer to use different electronic devices 30 at different times. Further, however, in certain instances, e.g., where fraud is relatively common or widespread, it may be desirable to not enable such features that allow sharing and/or plural users on a given electronic device 30.

Verification and/or authentication in the described system and method, including ancillary aspects thereof such as the obtaining of supplies, equipment, loans and/or funding, may be based upon a unique identifier, e.g., a device identifier, biometric data, and/or a biometric identifier, or a combination thereof, as may be desirable to an operator of the system, method and/or aspect thereof. Such verification and/or authorization may be employed to facilitate transactions within and without the system and method, e.g., as by linking to a bank, bank account, credit or debit card, for direct (e.g., bank-to-bank) or other electronic transfers of funds, payments, check cashing, mobile payment, and the like.

The foregoing verification and authentication enables electronic devices to be employed as biometrically verified mobile payment platforms, e.g., for engaging in any of the transactions and/or transfers described. The security of a biometrically authenticated transaction can be coupled with other identification, e.g., information such as personal information or a PIN that is known only by the person who has been biometrically authenticated, and plural verification and authentication techniques may be employed for increased security, e.g., for high monetary value transactions.

It is noted that the operation of the system and method herein will beneficially provide image data records of events and conditions, as well as confirming the location, date and time thereof, as a result of the use of images that are associated with location data and date and time data, e.g., by the electronic devices that capture such images (image data). Among uses of such image data can be the supporting and evaluation of insurance claims and/or the evaluating and managing of disaster conditions and relief efforts. It is feasible that the registration of participants, producers, plots, farms and facilities in the product exchange system and method herein could also be utilized in relation to insurance and relief operations.

Each of the U.S. Provisional Applications, U.S. patent applications, and/or U.S. patents, identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A method for a product exchange usable by plural producers comprising:

configuring an electronic device having a device identifier and including an imaging device for capturing image data, including a data entry device selected from the group including a touch screen, a keyboard, and a combination thereof, including a communication device selected from the group including wireless communication, Bluetooth communication, WiFi communication, cellular communication, satellite telephony communication, and a combination thereof, and including a geographic position locator for determining geographic location, the configuring including configuring the electronic device for geo-tagging captured image data using the determined geographic location and for time stamping the geo-tagged captured image data with date and/or time data;

receiving registration data from a producer using the electronic device, wherein the registration data is geo-tagged and time stamped and associated with the identifier of the electronic device;

receiving facility data defining a facility and product data defining a product of the facility using the electronic device, wherein the facility data includes one or more geo-tagged and time-stamped images of the facility and the product data includes one or more geo-tagged and time-stamped images that identifies the product, wherein the facility data and the product data are associated with the identifier of the electronic device;

storing the registration data, the facility data and the identifier of the electronic device associated therewith in a relational database that is separate from the electronic device;

whereby the producer and the producer facility are registered and the product is associated therewith in the relational database;

repeating the foregoing steps for registering a plurality of producers;

receiving registration data from a buyer and associating the buyer registration data with a unique buyer identifier;

receiving qualifying data from the buyer and associating the buyer qualifying data with the unique buyer identifier, wherein the buyer qualifying data includes funds data relating to funds available as payment for any product delivered;

storing the buyer registration data, the buyer qualifying data and the unique buyer identifier associated therewith in the relational database, whereby the buyer is registered and qualified;

receiving a product query for a certain product from the qualified buyer;

generating a response to the product query from the product data stored in the relational database relating to the certain product and communicating the response to the qualified buyer, wherein the generated response includes product data from the relational database relating to the certain product;

receiving from the qualified buyer one or more offers relating to the product data relating to the certain product and storing the one or more offers in the relational database;

communicating the received one or more offers to one or more registered producers of the certain products to which the one or more offers relate;

receiving from the one or more producers an acceptance or a rejection of the one or more communicated offers and storing the acceptance or rejection in the relational database;

receiving from the one or more producers and/or from the buyer an agreed quantity and delivery date for the certain products covered by the accepted offers and storing the agreed quantity and delivery date in the relational database;

after an offer is accepted, receiving from the one or more producers updated facility data and updated product data using the electronic device and storing the updated facility data and the updated product data in the relational database, wherein the updated facility data and the updated product data include one or more geo-tagged and time-stamped images of the facility and of the product, wherein the updated facility data and the updated product data are associated with the identifier of the electronic device;

when product is delivered, receiving product delivery data from the producer, from the buyer, and/or from a delivery agent, and storing the product delivery data in the relational database; and initiating transfer of payment from the buyer of the delivered product to the producer of the delivered product from buyer funds represented by the funds data as available as payment for the product delivered.

2. The method of claim 1 wherein said receiving facility data defining a facility includes:

receiving a first geo-tagged image of the facility taken at a first corner on a periphery thereof;

receiving a second geo-tagged image of the facility taken at a second corner along the periphery thereof;

receiving one or more additional geo-tagged images of the facility taken at one or more additional corners along the periphery thereof until geo-tagged images taken at all of the corners along the periphery of the facility are received;

storing the received geo-tagged images of the facility in the relational database.

3. The method of claim 2 further including:

processing location data associated with each of the geo-tagged images of the facility to determine the length of the periphery thereof; or processing location data associated with each of the geo-tagged images of the facility to determine the area thereof; or processing location data associated with each of the geo-tagged images of the facility to determine a geographic location thereof; or processing location data associated with each of the geo-tagged images of the facility to determine the length of the periphery and the area thereof; or processing location data associated with each of the geo-tagged images of the facility to determine the length of the periphery and the geographic location thereof; or processing location data associated with each of the geo-tagged images of the facility to determine the area and the geographic location thereof; or processing location data associated with each of the geo-tagged images of the facility to determine the length of the periphery, the area and the geographic location thereof.

4. The method of claim 3 further including:

storing the determined length of the periphery, the area and/or the geographic location in the relational database; or communicating the determined length of the periphery, the area and/or the geographic location to the electronic device from which the images taken at the corners of the periphery of the facility were taken; or storing the determined length of the periphery, the area and/or the geographic location in the relational database and communicating the determined length of the periphery, the area and/or the geographic location to the electronic device from which the images taken at the corners of the periphery of the facility were taken.

5. The method of claim 1 further including:

receiving a request for a supply or for an equipment or for an educational material or for a combination thereof, wherein the request originated from an electronic device and includes location data of that electronic device;

providing a response representing available supplies or available equipment or available educational materials or a combination thereof, at one or more locations proximate the geographic location of the electronic device represented by the location data thereof;

receiving and accepting an order for an available supply or for available equipment or for available educational materials or for a combination thereof represented in the response; and delivering the ordered available supply or ordered available equipment or ordered available educational materials or an ordered combination thereof at the one or more locations proximate the geographic location of the electronic device.

6. The method of claim 5 further including prior to the delivering the order:

filling the order; and debiting funds in payment for the order and authorizing delivery thereof.

7. The method of claim 1 further including:

receiving a request for a supply or for an equipment or for an educational material or for a combination thereof, wherein the request originates from an electronic device and includes location data of that electronic device;

providing a response representing available supplies or available equipment or available educational materials or a combination thereof, at one or more locations proximate the geographic location of the electronic device represented by the location data thereof;

receiving an order for an available supply or for available equipment or for available educational materials or for a combination thereof represented in the response;

receiving an application for a loan to pay for the ordered available supply or ordered available equipment or ordered available educational materials or an ordered combination thereof;

evaluating the application for a loan and when the loan is approved, then:

accepting the order for the available supply or for the available equipment or for the available educational materials or for the combination thereof represented in the response; and delivering the available supply or the available equipment or the available educational materials or the combination thereof represented by the accepted order.

8. The method of claim 7 further including prior to the delivering the order:

filling the order; or debiting funds from the approved loan in payment for the order and authorizing delivery of the order; or filling the order and debiting funds from the approved loan in payment for the order and authorizing delivery of the order.

9. The method of claim 1 further comprising:

comparing the one or more geo-tagged and time-stamped images of the product data stored in the relational data base and the one or more geo-tagged and time-stamped images of the updated product data from the relational database to determine the quantity of the product, or the quality of the product, or the quantity and quality of the product.

10. The method of claim 9 wherein the comparing the one or more geo-tagged and time-stamped images of the product data stored in the relational data base and the one or more geo-tagged and time-stamped images of the updated product data from the relational database includes:

comparing location data from the geo-tags thereof and when the location data from the geo-tags thereof is consistent with a particular facility, providing an indication thereof; or comparing time and/or date data from the time stamps thereof and when the time and/or date data is consistent with a period of time between when the facility was registered and a current time, providing an indication thereof; or comparing location data from the geo-tags thereof and comparing time and/or date data from the time stamps thereof, and when the location data from the geo-tags thereof is consistent with a particular facility and when the time and/or date data is consistent with a period of time between when the facility was registered and a current time, providing an indication thereof.

11. The method of claim 9 wherein the comparing the one or more geo-tagged and time-stamped images of the product included in the product data stored in the relational data base and the one or more geo-tagged and time-stamped images of the product included in the updated product data from the relational database includes:

comparing image data from the one or more geo-tagged and time-stamped images of the product to determine one or more physical attributes of the product represented therein; and then:

determining from differences in the one or more physical attributes of the product represented therein a quantity of the product represented therein; or determining from differences in the one or more physical attributes of the product represented therein a quality of the product represented therein; or determining from differences in the one or more physical attributes of the product represented therein a quantity and a quality of the product represented therein.

12. The method of claim 1 wherein:

the electronic device includes a smart phone, a tablet computer, a portable computer or another electronic computing device; or said configuring the electronic device includes communicating a software application to the electronic device and running the software application thereon; or the electronic device includes a smart phone, a tablet computer, a portable computer or another electronic computing device and said configuring the electronic device includes communicating a software application to the electronic device and running the software application thereon.

13. The method of claim 1 wherein: the facility represented by the facility data includes a field, a plot of land, a farm, a pasture, a pond, a pool, a lake, a range, a quarry, a room, a shop, a work area, a manufacturing facility, an assembly facility, a repair facility, a maintenance facility, a factory, or any combination thereof.

14. The method of claim 1 wherein: the product represented by the product data includes a fruit, a vegetable, a plant, a bush, a tree, a crop, an animal, a herd, livestock, a bird, a fowl, a fish, a water creature, sand, rock, gravel, crushed stone, a part, an assembly, a handicraft, a garment, cloth, clothes, wearing apparel, a mechanical device, an electrical device, an electronic device, or any combination thereof.

* * * * *